(12) United States Patent
Lee

(10) Patent No.: US 12,556,671 B2
(45) Date of Patent: Feb. 17, 2026

(54) THREE DIMENSIONAL STROBO-STEREOSCOPIC IMAGING SYSTEMS AND ASSOCIATED METHODS

(71) Applicant: The Texas A&M University System, College Station, TX (US)

(72) Inventor: ChaBum Lee, College Station, TX (US)

(73) Assignee: The Texas A&M University System, College Station, TX (US)

( * ) Notice: Subject to any disclaimer, the term of this patent is extended or adjusted under 35 U.S.C. 154(b) by 0 days.

(21) Appl. No.: 18/906,582

(22) Filed: Oct. 4, 2024

(65) Prior Publication Data
US 2025/0030824 A1 Jan. 23, 2025

Related U.S. Application Data

(63) Continuation of application No. 17/944,384, filed on Sep. 14, 2022, now Pat. No. 12,137,200.

(60) Provisional application No. 63/244,119, filed on Sep. 14, 2021.

(51) Int. Cl.
| H04N 13/156 | (2018.01) |
| H04N 13/167 | (2018.01) |
| H04N 13/239 | (2018.01) |
| H04N 13/254 | (2018.01) |

(52) U.S. Cl.
CPC ......... *H04N 13/156* (2018.05); *H04N 13/167* (2018.05); *H04N 13/239* (2018.05); *H04N 13/254* (2018.05)

(58) Field of Classification Search
CPC .. H04N 13/156; H04N 13/167; H04N 13/239; H04N 13/254; H04N 2013/0081; H04N 13/296
USPC ........................................................... 348/43
See application file for complete search history.

(56) References Cited

U.S. PATENT DOCUMENTS

| 2003/0110610 A1* | 6/2003 | Duquette | H04N 13/239 |
| | | | 348/E13.005 |
| 2011/0128286 A1* | 6/2011 | Park | G06T 7/564 |
| | | | 345/424 |
| 2016/0379377 A1* | 12/2016 | Milne | G01N 21/51 |
| 2020/0393478 A1* | 12/2020 | Tronrud | B04B 13/00 |
| 2021/0173194 A1* | 6/2021 | Corbett | G02B 21/367 |

* cited by examiner

*Primary Examiner* — Susan E. Hodges
(74) *Attorney, Agent, or Firm* — Conley Rose, P.C.

(57) ABSTRACT

A method for reconstructing a three-dimensional (3D) of a sample includes displacing an outer surface of the sample at a desired sample, repeatedly activating an ultraviolet stroboscopic illuminator to produce ultraviolet excitation light at a frequency that is based on the speed of the sample, repeatedly activating a pair of laterally spaced cameras of a stereoscopic imaging unit as the outer surface of the sample is displaced to capture a plurality of 2D images of different sections of the outer surface of the sample, and reconstructing a 3D image of the sample from the plurality of 2D images of the different sections captured by the pair of cameras.

20 Claims, 15 Drawing Sheets

THREE DIMENSIONAL STROBO-STEREOSCOPIC IMAGING SYSTEMS AND ASSOCIATED METHODS

CROSS-REFERENCE TO RELATED APPLICATIONS

This present application is a continuation of U.S. non-provisional patent application Ser. No. 17/944,384 filed Sep. 14, 2022, entitled "Three Dimensional Strobo-Stereoscopic Imaging Systems and Associated Methods", which claims benefit of U.S. provisional patent application No. 63/244,119 filed Sep. 14, 2021, entitled "Strobo-Stereoscopic Three Dimensional Imaging Systems and Methods," both of which are hereby incorporated herein by reference in their entirety for all purposes.

STATEMENT REGARDING FEDERALLY SPONSORED RESEARCH OR DEVELOPMENT

Not applicable.

BACKGROUND

Three-dimensional (3D) imaging processes are utilized in the creation of 3D image data based on captured two-dimensional (2D) image data in a variety of industries for manifold purposes including in the identification of 3D surface structures and patterns. As one example, 3D imaging processes such as interferometry are utilized in the inspection of cutting tools and other industrial machinery for the purpose of monitoring wear and tear, as well as in manufacturing processes used to produce semiconductor devices, visual displays, and other electronic devices. As just a couple of examples, 3D imaging techniques, along with a host of other, indirect techniques, may thus be utilized for monitoring surface wear of certain components such as cutting tools, and for quality control purposes in monitoring the condition of manufactured components.

BRIEF SUMMARY OF THE DISCLOSURE

An embodiment of a 3D fluorescent strobo-stereoscopic imaging system comprises a drive configured to couple to a sample to be imaged by the system, wherein the drive is configured to displace an outer surface of the sample at a desired speed, an ultraviolet stroboscopic illuminator configured to produce ultraviolet excitation light to stroboscopically illuminate the outer surface of the sample when the sample is coupled to the drive, a stroboscopic control module coupled to the drive and the stroboscopic illuminator, wherein the stroboscopic control module comprises a processor and a memory device encoded with instructions that, when executed by the processor of the stroboscopic control module, cause the stroboscopic control module to repeatedly activate the stroboscopic illuminator at a frequency that is based on the speed of the sample, a stereoscopic imaging unit comprising a pair of laterally spaced cameras orientable in the direction of the outer surface of the sample and configured to capture 2D images of different sections of the outer surface of the sample as the outer surface of the sample is displaced by the drive, and an image reconstruction module in signal communication with the stereoscopic imaging unit, wherein the image reconstruction module comprises a processor and a memory device encoded with instructions that, when executed by the processor of the image reconstruction module, cause the image reconstruction module to reconstruct a 3D image of the sample from the 2D images of the different sections of the outer surface of the sample captured by the pair of cameras of the stereoscopic imaging unit. In some embodiments, the drive comprises a rotary drive configured to rotate the sample about a rotational axis. In some embodiments, a fluorescent coating is formed on the outer surface of the sample. In certain embodiments, the viscosity of the fluorescent coating is equal to or greater than ten micrometers. In certain embodiments, the stereoscopic imaging unit comprises a pair of band-pass filters positioned between the pair of cameras and the sample, wherein the pair of band-pass filters are configured to filter light reflected off the outer surface of the sample to produce filtered light that is received by the pair of cameras. In some embodiments, the reflected light contains wavelengths corresponding to an emission wavelength that is greater than an excitation wavelength of the excitation light and an ambient wavelength that is equal to or less than the excitation wavelength, and the pair of band-pass filters are configured to filter from the filtered light wavelengths of the reflected light that are less than the emission wavelength. In some embodiments, the difference between the emission wavelength and the excitation wavelength corresponds to a Stokes shift produced by a fluorescent coating formed on the outer surface of the sample.

An embodiment of a 3D strobo-stereoscopic imaging system comprises a drive configured to couple to a sample to be imaged by the system, wherein the drive is configured to displace an outer surface of the sample at a desired speed, a stroboscopic illuminator configured to produce excitation light to stroboscopically illuminate the outer surface of the sample when the sample is coupled to the drive, a stroboscopic control module coupled to the drive and the stroboscopic illuminator, wherein the stroboscopic control module comprises a processor and a memory device encoded with instructions that, when executed by the processor of the stroboscopic control module, cause the stroboscopic control module to repeatedly activate the stroboscopic illuminator at a frequency that is based on the speed of the sample, a stereoscopic imaging unit comprising a pair of laterally spaced cameras orientable in the direction of the outer surface of the sample and configured to capture 2D images of different sections of the outer surface of the sample as the outer surface of the sample is displaced by the drive, and an image reconstruction module in signal communication with the stereoscopic imaging unit, wherein the image reconstruction module comprises a processor and a memory device encoded with instructions that, when executed by the processor of the image reconstruction module, cause the image reconstruction module to reconstruct an initial surface map of the sample from the 2D images, segment the initial surface map based on features contained therein to separate a background image from a target image each contained in the initial surface map, separately condition the background image and the target image to produce a conditioned background image and a conditioned target image, and merge the conditioned background image with the conditioned target image to form a final surface map of the sample. In certain embodiments, the drive comprises a rotary drive configured to rotate the sample about a rotational axis. In certain embodiments, the instructions encoded onto the memory device of the image reconstruction module, when executed by the processor of the image reconstruction module, cause the image reconstruction module to minimize image distortions from the 2D images to produce a plurality of conditioned 2D images, and reconstruct the initial surface map of the sample from the plurality of conditioned 2D images. In some embodiments, the instructions encoded onto the memory device of the image reconstruction module, when executed by the processor of the image reconstruction module, cause the image reconstruction module to merge by linear extraction the conditioned background image with the conditioned target image to form the final surface map of the sample. In some embodiments, a fluorescent coating is formed on the outer surface of the sample. In certain embodiments, the viscosity of the fluorescent coating is equal to or greater than ten micrometers. In certain embodiments, the stroboscopic illuminator comprises an ultraviolet stroboscopic illuminator configured to produce ultraviolet excitation light.

An embodiment of a method for reconstructing a 3D image of a sample comprises (a) displacing an outer surface of the sample at a desired sample, (b) repeatedly activating an ultraviolet stroboscopic illuminator to produce ultraviolet excitation light at a frequency that is based on the speed of the sample, (c) repeatedly activating a pair of laterally spaced cameras of a stereoscopic imaging unit as the outer surface of the sample is displaced to capture a plurality of 2D images of different sections of the outer surface of the sample, and (d) reconstructing a 3D image of the sample from the plurality of 2D images of the different sections captured by the pair of cameras. In some embodiments, (a) comprises rotating the sample about a rotational axis. In some embodiments, a fluorescent coating is formed on the outer surface of the sample. In certain embodiments, the viscosity of the fluorescent coating is equal to or greater than ten micrometers. In certain embodiments, the method comprises (e) filtering by a pair of band-pass filters light reflected off the outer surface of the sample to produce filtered light that is received by the pair of cameras. In some embodiments, the reflected light contains wavelengths corresponding to an emission wavelength that is greater than an excitation wavelength of the excitation light and an ambient wavelength that is equal to or less than the excitation wavelength, and (e) comprises (e1) filtering wavelengths by the pair of band-pass filters wavelengths of the reflected light that are less than the emission wavelength.

BRIEF DESCRIPTION OF THE DRAWINGS

For a detailed description of exemplary embodiments of the disclosure, reference will now be made to the accompanying drawings in which.

DETAILED DESCRIPTION

Figure 1:
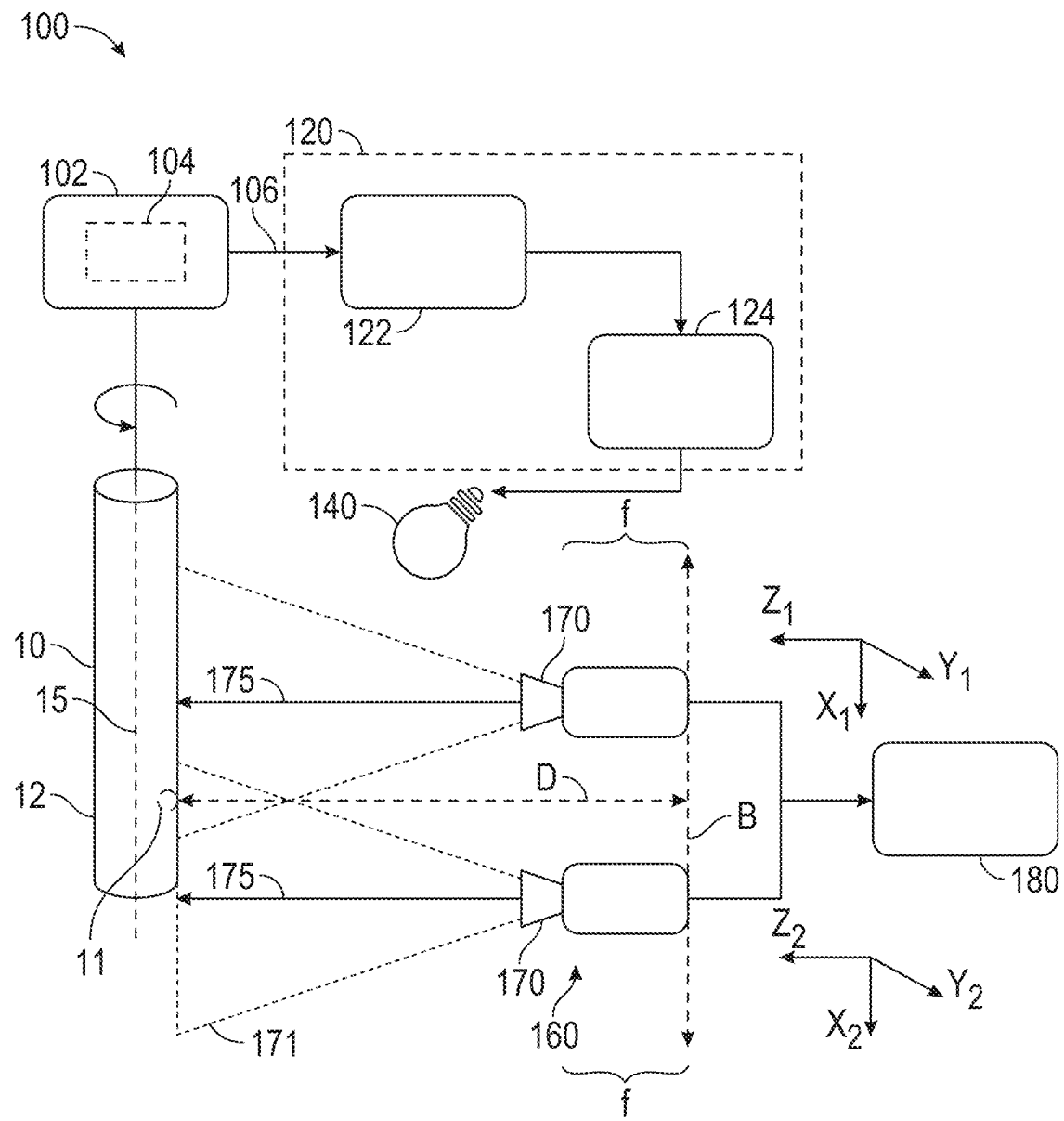
FIG. 1 is a schematic view of an embodiment of a 3D strobo-stereoscopic imaging system.

The following discussion is directed to various exemplary embodiments. However, one skilled in the art will understand that the examples disclosed herein have broad application, and that the discussion of any embodiment is meant only to be exemplary of that embodiment, and not intended to suggest that the scope of the disclosure, including the claims, is limited to that embodiment.

Certain terms are used throughout the following description and claims to refer to particular features or components. As one skilled in the art will appreciate, different persons may refer to the same feature or component by different names. This document does not intend to distinguish between components or features that differ in name but not function. The drawing figures are not necessarily to scale. Certain features and components herein may be shown exaggerated in scale or in somewhat schematic form and some details of conventional elements may not be shown in interest of clarity and conciseness.

In the following discussion and in the claims, the terms "including" and "comprising" are used in an open-ended fashion, and thus should be interpreted to mean "including, but not limited to . . . " Also, the term "couple" or "couples" is intended to mean either an indirect or direct connection. Thus, if a first device couples to a second device, that connection may be through a direct connection, or through an indirect connection via other devices, components, and connections. In addition, as used herein, the terms "axial" and "axially" generally mean along or parallel to a central axis (e.g., central axis of a body or a port), while the terms "radial" and "radially" generally mean perpendicular to the central axis. For instance, an axial distance refers to a distance measured along or parallel to the central axis, and a radial distance means a distance measured perpendicular to the central axis. As used herein, the terms "approximately," "about," "substantially," and the like mean within 10% (i.e., plus or minus 10%) of the recited value. Thus, for example, a recited angle of "about 80 degrees" refers to an angle ranging from 72 degrees to 88 degrees.

As described above, 3D imaging processes may be employed in a variety of industries for the monitoring of surface features of a device for varying reasons including the monitoring of wear in the context of cutting tools and for quality control purposes in at least some manufacturing processes. As an example, interferometry processes, confocal microscopy processes, and other techniques have been employed in conjunction with machine or computer vision processes for monitoring devices such as cutting tools. Computer vision processes may particularly provide for the employment of deep learning algorithms in the interest of improving resultant image quality.

While such techniques may provide valuable monitoring and feature detection at minute scales, conventional 3D imaging processes have generally been limited in their application for real-time surface feature monitoring for several reasons, including the substantial costs associated with the equipment employed in such techniques including, for example, scanning electron microscopes (SEMs), atomic force microscopes (AFMs), and knife-edge interferometers. Additionally, the complexity of computer vision techniques Additionally, conventional 3D imaging processes are often resistant to automation and real-time monitoring of devices as they are normally operated. Computer vision techniques employed in conventional 3D imaging processes may demand considerable computational resources and associated expense.

Accordingly, embodiments of 3D strobo-stereoscopic imaging systems are described herein which allow for the real-time direct monitoring of surface features and which utilizes low cost equipment compared to the exotic equipment sometimes employed in conventional 3D imaging systems. Embodiments of strobo-stereoscopic 3D imaging systems disclosed herein may also avoid the considerable computation resources and associated expenses required of some computer vision techniques employed in conventional 3D imaging processes.

Particularly, embodiments of strobo-stereoscopic imaging systems described herein include a rotary drive configured to rotate a sample coupled thereto at a desired rotational speed, a stroboscopic illuminator configured to illuminate the sample as it rotates by the rotary drive, a stroboscopic control module which repeatedly activates the stroboscopic illuminator at a frequency based on the rotational speed of the sample, a stereoscopic imaging unit comprising a pair of laterally spaced cameras, and an image reconstruction module configured to reconstruct a 3D image (e.g., a surface map) of the sample from 2D images produced by the pair of cameras.

Referring now to FIG. 1, an embodiment of a 3D strobo-stereoscopic imaging system 100 is shown. Strobo-stereoscopic imaging system 100 may be employed to identify, detect, and monitor 3D surface features of a sample 10 shown schematically in FIG. 1. As will be described further herein, strobo-stereoscopic imaging system 100 may provide for real-time surface monitoring of sample 10 for a variety of purposes including wear monitoring, quality control, and others.

In this exemplary embodiment, strobo-stereoscopic imaging system 100 generally includes a rotational drive 102, a stroboscopic control module 120, a stroboscopic illuminator 140, a stereoscopic imaging unit 160, and a 3D image reconstruction module 180. Rotational drive 102 of strobo-stereoscopic imaging system 100 is configured to rotate, at a desired rotational speed, the sample 10 about a rotational axis 15 which may or may not correspond to a longitudinal or central axis of the sample 10. In this exemplary embodiment, rotational drive 102 comprises a servo or motor controller 104 configured to control the application of rotational torque to the sample 10 to thereby rotate the sample 10 about the rotational axis 15. Additionally, motor controller 104 includes one or more sensors for monitoring parameters of the rotational drive 102. Particularly, in this exemplary embodiment, motor controller 104 comprises an encoder configured to detect a rotational angle and speed of the rotational drive 102 (e.g., an output shaft of the rotational drive 102). The encoder of motor controller 104 generates an encoder signal 106 which may be provided to the stroboscopic control module 120, as will be described further herein. Additionally, it may be understood that the configuration of rotational drive 102 including the configuration of motor controller 104 may vary substantially depending on the given application.

The stroboscopic control module 120 of strobo-stereoscopic imaging system 100 controls the operation of rotational drive 102 and of the stroboscopic illuminator 140 of system 100. As will be described further herein, stroboscopic control module 120 is configured such that the frequency of activation or illumination of stroboscopic illuminator 140 is contingent or based on the rotational speed of sample 10 about rotational axis 15. In other words, stroboscopic control module 120 synchronizes the periodic activation of stroboscopic illuminator 140 with the rotational frequency of the sample 10 rotating about rotational axis 15. In this exemplary embodiment, stroboscopic control module 120 includes a pulse counter 122 and a phase conditioning module 124.

Stroboscopic control module 120 is in signal communication with the motor controller 104 of rotational drive 102 and receives the encoder signal 106 therefrom. In this exemplary embodiment, encoder signal 106 includes a zero position or simply "Z" pulse outputted by the motor controller 104 once per revolution of a zero position of the encoder of motor controller 104. In other words, included in the encoder signal 106 is a Z pulse which is generated for each revolution of the sample 10 about the rotational axis 15 as measured from the zero position of the encoder of motor controller 104. Pulse counter 122 of stroboscopic control module 120 thus registers or counts each successive Z pulse included in the encoder signal 106 provided to the stroboscopic control module 120.

Figure 2:
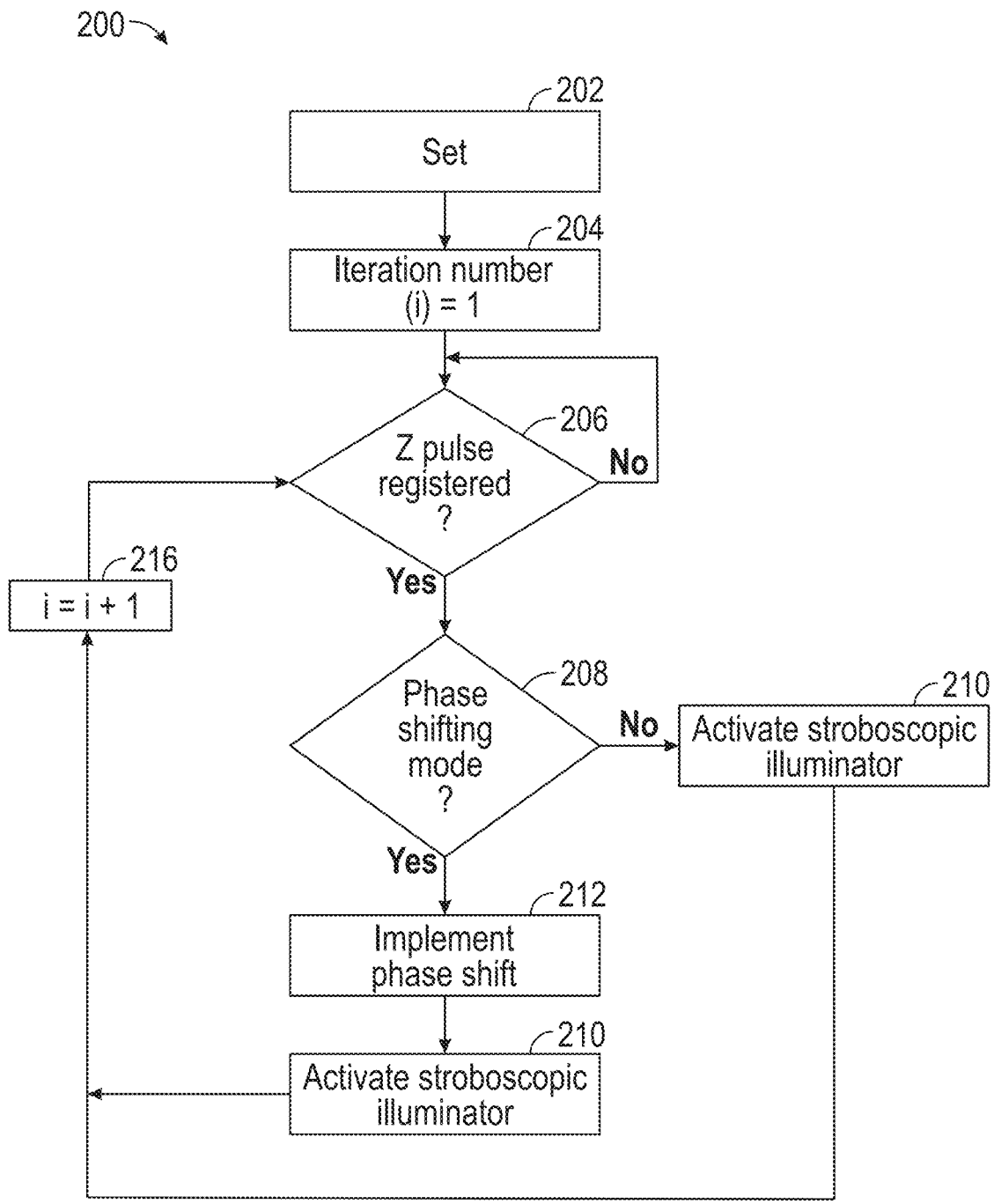
FIG. 2 is a flowchart of an embodiment of a control schema of the strobo-stereoscopic imaging system of FIG. 1.

The phase conditioning module 124 of stroboscopic control module 120 controls the activation of stroboscopic illuminator 140 in accordance with one or more different operational modes. Referring now to FIG. 2, a flowchart 200 illustrating an exemplary control schema executable by the phase conditioning module 124 of stroboscopic control module 120 is shown. Block 202 of flowchart 200 indicates an initial activation of the rotational drive 102 of strobo-stereoscopic imaging system 100 whereby the sample 10 is accelerated from an initial rest or stationary position towards a desired rotational speed about the rotational axis 15. Block 204 of flowchart 200 registers a first iteration (I=1) of the control schema illustrated by flowchart 200 following the activation of the rotational drive 102 at block 202.

Block 206 of flowchart 200 illustrates the monitoring of the Z pulse included in the encoder signal 106 received by the phase conditioning module 124 of stroboscopic control module 120. As indicated in FIG. 2, flowchart 200 does not proceed from block 206 until the Z pulse associated with the given iteration (I) of the control schema illustrated by flowchart 200. In the instance directly following the initial activation of rotational drive 102 (i=1), flowchart 200 proceeds from block 206 to block 208 once the first Z pulse has been registered at block 206—the first Z pulse indicating the completion of the first rotation of the sample 10 about rotational axis 15.

At block 208 of flowchart 200 a selected operational mode of the phase conditioning module 124 is determined. Particularly, in this exemplary embodiment, block 208 determines whether a phase locked operational mode or a phase-shifting operational mode has been selected (e.g., pre-selected by an operator of strobo-stereoscopic imaging system 100). If a phase locked operational mode has been selected, then flowchart 200 proceeds to block 210 where the stroboscopic illuminator 140 is activated to illuminate the sample 10 as the sample 10 rotates about the rotational axis 15. Following the activation of stroboscopic illuminator 140 at block 210, flowchart 200 proceeds to block 216 where 1 is added to the current iteration (I) to mark the progress of flowchart 200 to the subsequent iteration (I) (e.g., moving from the first iteration (I=1) of flowchart 200 to a second iteration (I=2) of flowchart 200). Flowchart 200 returns to block 206 from block 216 where the implementation of blocks 206 and 208 of flowchart 200 are repeated for another iteration.

Conversely, when it is determined at block 208 that a phase shifting operational mode has been selected, the control schema of flowchart 200 passes from block 208 to block 212 where a phase shift is implemented. The phase shift implemented by block 212 may delay the activation of stroboscopic illuminator 140 such that, at least for the current iteration of flowchart 200, the frequency of the activation of stroboscopic illuminator 140 is different from, but based on, the frequency of the rotation of the sample 10 (e.g., the frequency at which sample 10 makes an entire rotation about rotational axis 15).

Additionally, the delay implemented by block 212 may be based on a desired frequency (F) of the activation of stroboscopic illuminator 140 as well as a desired number of images per cycle (N) that is wished to be captured per a given revolution of the sample 10. Not intending to be bound by any particular theory, the time delay (t) in seconds implemented by block 212 for each of a plurality of iterations (i) (each occurring within a given iteration (I) of flowchart 200) may be expressed in accordance with Equation (1) below, where (RPM) refers to the rotational speed in revolutions per minute of the sample 10:

$$t = i\left(\frac{60}{RPM}\right) - \left(\frac{60}{RPM - \left(\frac{N}{RPM}\right)}\right) \quad (1)$$

As an example, with sample 10 rotating at 90 RPM about rotational axis 15 and with the number of images per cycle (N) selected to be 18, block 212 may be implemented across eighteen separate iterations (i) to thereby collect, using stereoscopic imaging unit 160 (the activation of unit 160 being synced to the activation of stroboscopic illuminator 140), eighteen images of eighteen different locations along the circumference of sample 10 spaced 20 degrees apart from each other. Thus, the phase shifting operational mode of phase conditioning module 124 permits for the collection of a desired number of images corresponding to a desired number of separate target locations (a single target location 11 indicated in FIG. 1 as an example) spaced equidistantly along the circumference of sample 10. The density of the images (e.g., the degree of spacing along the circumference of sample 10 between adjacent images) may thus be controlled based on the rotational speed of the sample 10 and the number of images per cycle (N) to be collected by the stereoscopic imaging unit 160 (activated at the same time as each activation of stroboscopic illuminator 140). This is in contrast to the phase locked operational mode in which images corresponding to a single location along the circumference of sample 10 may be collected given that, when in the phase locked operational mode, the frequency of the activation of stroboscopic illuminator 140 is the same as the frequency of the rotating sample 10.

Referring again to FIG. 1, in this exemplary embodiment, stroboscopic illuminator 140 of strobo-stereoscopic imaging system 100 comprises a light-emitting diode (LED) which may be activated or "blinked" as controlled by the stroboscopic control module 120 described above. Stroboscopic illuminator 140 may, upon activation, emit light in the visible portion of the electromagnetic spectrum and/or other portions of the electromagnetic spectrum including, for example, the ultraviolet portion of the electromagnetic spectrum. Additionally, while only a single stroboscopic illuminator 140 is shown in FIG. 1, it may be understood that a plurality of stroboscopic illuminators 140 synced in their activation may be utilized in some embodiments.

In this exemplary embodiment, the stereoscopic imaging unit 160 of strobo-stereoscopic imaging system 100 comprises a pair of cameras 170 each positioned proximal the sample 10 with an optical axis 175 of each camera 170 extending from the camera 170 towards the sample 10 with the target location 11 positioned between the cameras 170. In some embodiments, each camera 170 comprises a relatively inexpensive charge coupled device (CCD) camera having a framerate been approximately 20 frames per second and 40 frames per second. However, it may be understood that the configuration of cameras 170 may vary in other embodiments. For example, in some embodiments, cameras 170 may comprise various types of differing lens systems depending on the desired image quality and resolution.

As shown in FIG. 1, the target location 11 is positioned between the pair of cameras 170 and falling within a field of view (FOV) 171 of each camera 170. The pair of cameras 170 are configured to capture bilaterally symmetrical images of the target location 11. The orientation and position of cameras 170 with respect to the target location 11 may be controlled to allow for the reconstruction of the 3D outer surface 12 of the sample 10. Particularly, each camera 170 is oriented in accordance with its own coordinate system ($X_1$, $Y_1$, and $Z_1$) for the first camera 170 of the pair of cameras and ($X_2$, $Y_2$, and $Z_2$) for the second camera 170 of the pair of cameras 170. Not intending to be bound by any particular theory, the relative positioning of the pair of cameras 170 and the target location along sample 10 may be determined in accordance with Equation (2) below where (D) represents the distance between the target 11 and the cameras 170, (B) represents the baseline extending between the pair of cameras 170, (f) represents the focal length of the pair of cameras 170, and ($Y_1$) and ($Y_2$) refer to the orientation of the pair of cameras 170:

$$D = f\left(\frac{B}{y_2 - y_1} - 1\right) \quad (2)$$

With cameras 170 properly positioned and oriented relative to the target location 11 of the sample 10, cameras 170 of stereoscopic imaging unit 160 may be calibrated (e.g., using calibration checkerboard patterns) to determine the intrinsic and extrinsic camera parameters or projection matrix coefficients of stereoscopic imaging unit 160 which permit the transfer of scene points in 3D space to their corresponding image points, thereby permitting the recovery of the measured depth of the given image.

Figure 3:
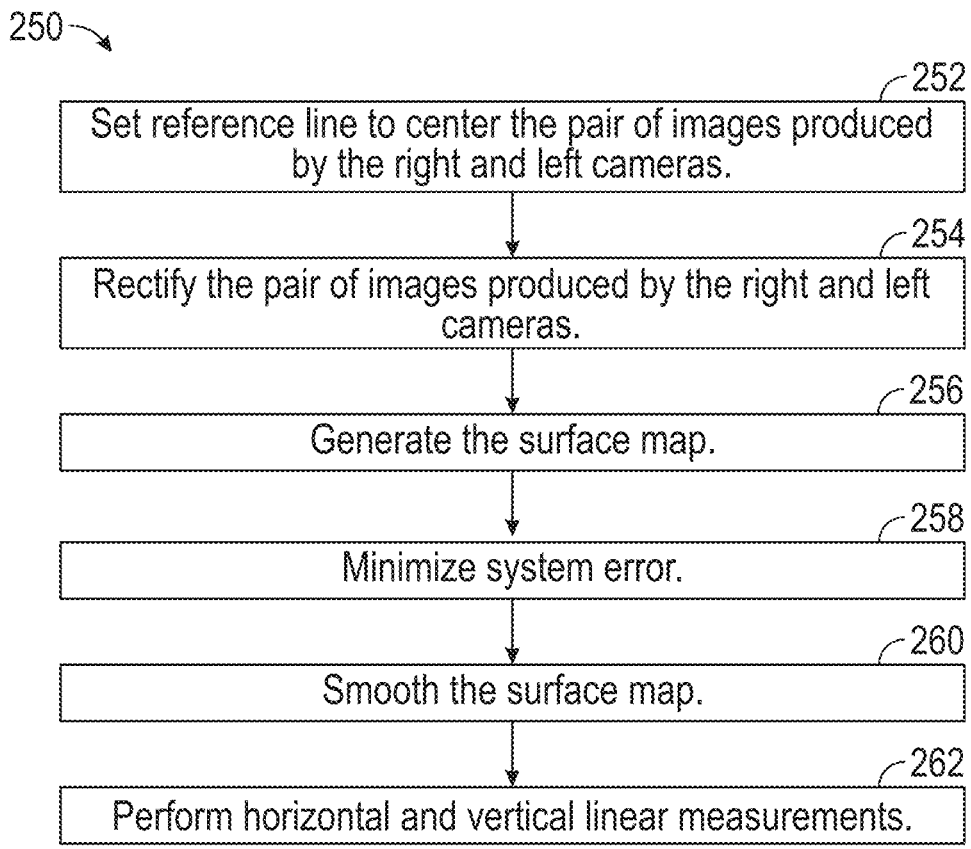
FIG. 3 is a flowchart of an embodiment of an image reconstruction process executable by the strobo-stereoscopic imaging system of FIG. 1.

The image reconstruction module 180 of strobo-stereoscopic imaging system 100 receives each pair of two-dimensional (2D) images generated by the stereoscopic imaging unit 160 and converts the received 2D images into a 3D image or surface "depth" map representing the 3D outer surface 12 of the sample 10. Referring now to FIG. 3, a flowchart is shown illustrating an exemplary image reconstruction process 250 executable by the image reconstruction module 180 of strobo-stereoscopic imaging system 100 for forming 3D images from the pairs of 2D images generated by the stereoscopic imaging unit 160 of strobo-stereoscopic imaging system 100.

At block 252 of image reconstruction process 250, a reference line is set to center a given pair of 2D images generated by the pair of cameras 170 at a given point in time. With the pair of 2D images being centered about the reference line, image reconstruction process 250 continues at block 254 where the pair of centered 2D images are stereoscopically rectified to produce a single 3D image from the pair of 2D images. At blocks 256 of image reconstruction process 250 a 3D surface map is reconstructed from the rectified image including information for each of the X, Y, and Z positions of each location within the generated surface map. As used herein, the term "surface map" is analogous to "depth map" and refers to a 3D image that includes information relating to the distance or depth of surfaces of objects contained in the surface map.

At blocks 258 and 260, respectively, of image reconstruction process 250, system errors are removed or minimized through one or more filtering techniques (e.g., Gaussian filters) and the generated surface map is smoothed to produce a 3D image or partial surface reconstruction of the sample 10 that is associated with the pair of 2D images (along with the specific target location 11 corresponding to the pair of associated 2D images) used to create the surface map and the given target location 11. It may be understood that in other embodiments image reconstruction process 250 may vary and thus may not include each of the blocks 252-260 shown in FIG. 3 and/or may include additional blocks not shown in FIG. 3.

The partial surface reconstruction produced by the image reconstruction process 250 described above corresponds to a single target location 11 along the circumference of the sample 10. Thus, a plurality of the partial surface reconstructions corresponding to a plurality of target locations 11 circumferentially spaced along the circumference of the sample 10 must be combined or "stitched" together to generate a 3D whole-view image or surface reconstruction of the entire circumference of the sample 10 at a given location along the longitudinal length of the sample 10.

Figure 4:
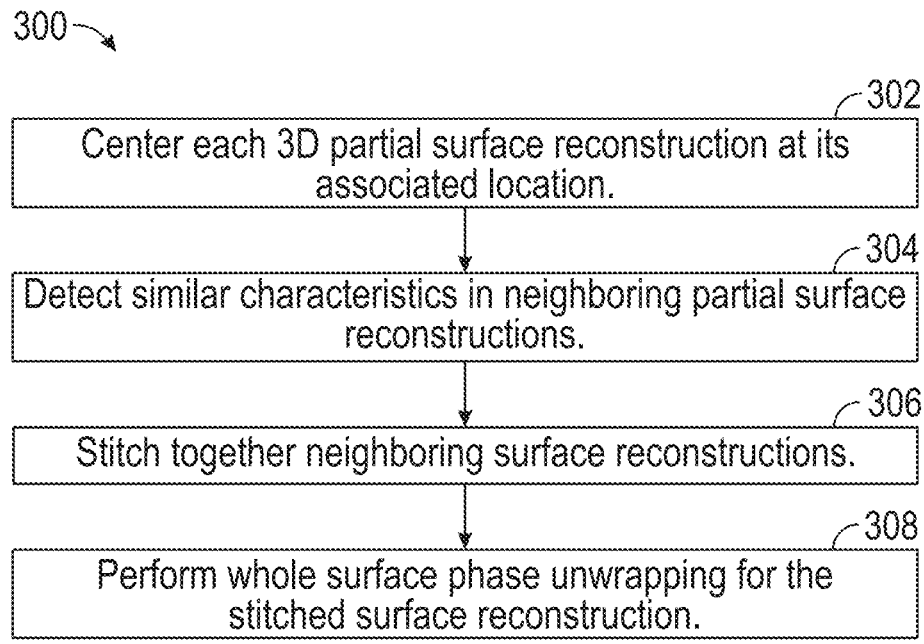
FIG. 4 is a flowchart of an embodiment of a whole-view reconstruction process executable by the strobo-stereoscopic imaging system of FIG. 1.

Referring now to FIG. 4, a flowchart is shown illustrating an exemplary whole-view reconstruction process 300 executable by the image reconstruction module 180 of strobo-stereoscopic imaging system 100 for forming a 3D whole-view image or surface reconstruction which extends across the entire circumference of the sample 10. Beginning at block 302, whole-view reconstruction process 300 includes centering each partial surface reconstruction at its associated location. Block 302 thus arranges the plurality of partial surface reconstructions into a sequence corresponding to the physical sequence of target locations along the circumference of sample 10 corresponding to each given partial surface reconstruction. At block 304, whole-view reconstruction process 300 includes detecting or finding similar characteristics in neighboring partial surface reconstructions which may be used as points of reference for the stitching together of the neighboring partial surface reconstructions as will be described further herein. In some embodiments, block 304 comprises applying a scale-invariant feature transform (SIFT) process for detecting similar characteristics in the neighboring partial surface reconstructions; however, in other embodiments, the process employed at block 304 may vary.

At block 306, whole-view reconstruction process 300 includes stitching together the neighboring surface reconstructions to form an initial 3D whole-view or panorama surface reconstruction or map of the sample 10. In some embodiments, the stitching together of neighboring surface reconstructions is performed by feature detection matching. Following the formation of the initial whole-view surface reconstruction at block 306, whole-view reconstruction process 300 includes at block 308 performing a whole surface phase unwrapping of the initial stitched surface reconstruction to remove stitching errors that occurred at block 306, thereby providing a final whole-view surface reconstruction of the sample 10. The final whole-view surface reconstruction produced at block 308 may be presented in 3D or unwrapped in 2D, each mode of presentation indicating positional information for each physical (X, Y, and Z) dimension for the entire circumference (at a given longitudinal position) of the sample 10. It may be understood that in other embodiments whole-view reconstruction process 300 may vary and thus may not include each of the blocks 302-308 shown in FIG. 4 and/or may include additional blocks not shown in FIG. 4.

In some instances, specular reflection of the light emitted by stroboscopic illuminator 140 against the outer surface 12 of sample 10 may inhibit the accuracy of 3D imaging system 100 in producing partial and whole-view surface reconstructions of the sample 10, even when the reflectivity of the outer surface 12 is reduced via dark paint or other surface finishing materials. This issue may be of particular importance in some manufacturing processes such as roll-to-roll (R2R) manufacturing processes in which printed electronics or other patterns are printed, coated, or embedded onto a rolled substrate that is fed continuously from one roller to another of the R2R process. Such R2R manufacturing processes are particularly popular in the production of visual displays and other electronics. While the continuous nature of R2R manufacturing processes lend themselves to real-time, continuous monitoring using strobo-stereoscopic 3D imaging systems, the typical reflectivity of the rolled substrate may result in specular reflection issues which may, as described above, limit the accuracy of the surface reconstruction produced by the 3D imaging system.

Figure 5:
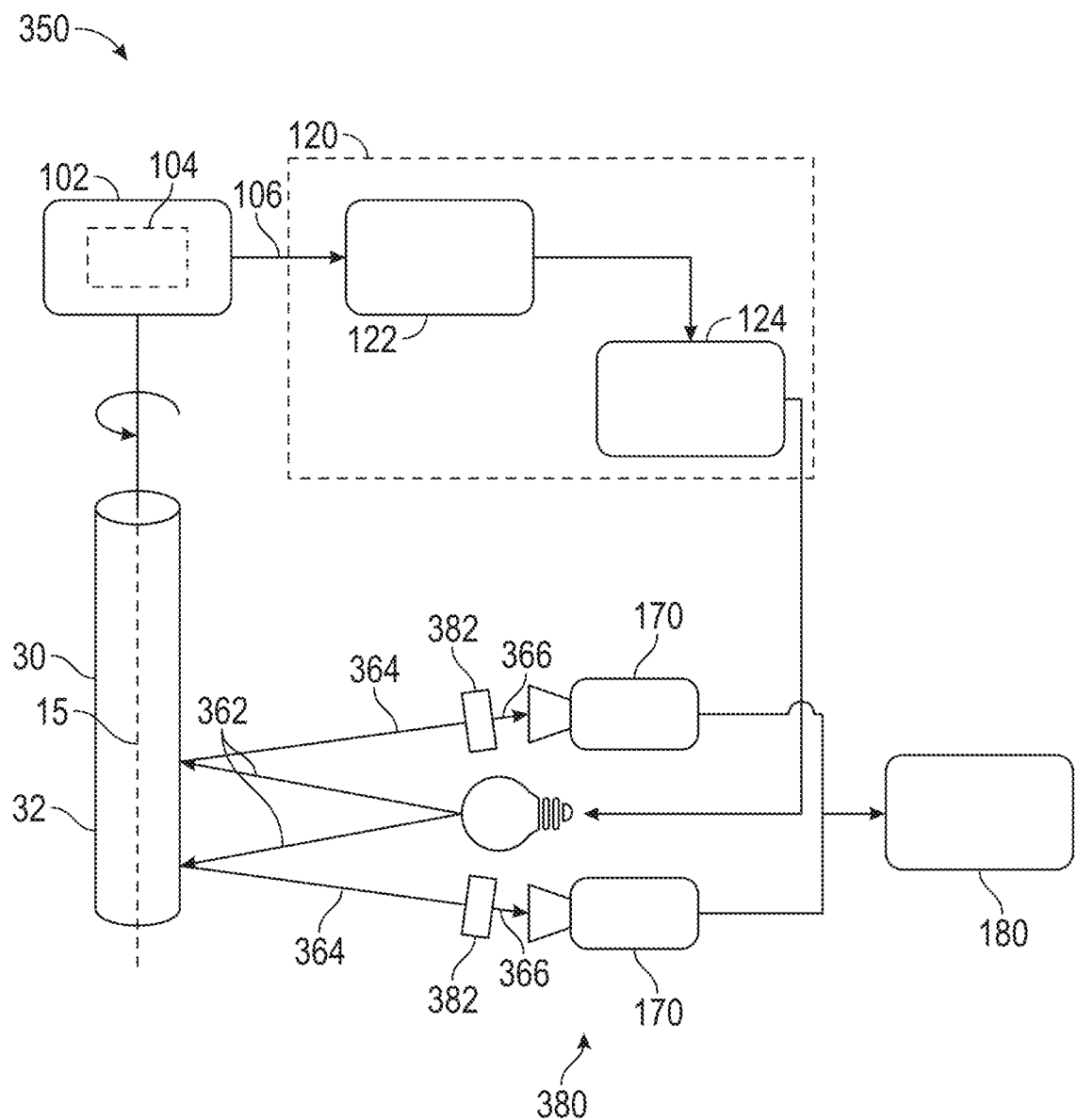
FIG. 5 is a schematic view of another embodiment of a strobo-stereoscopic imaging system.

Referring now to FIG. 5, an embodiment of a 3D fluorescent strobo-stereoscopic (FSS) imaging system 350 is shown configured for producing in real-time 3D surface reconstructions of devices having reflective surfaces which would normally pose issues relating to specular reflection. As such, FSS imaging system 350 may be employed to identify, detect, and monitor 3D surface features of reflective devices including the reflective rolled substrates common in R2R and other manufacturing processes.

FSS imaging system 350 includes features in common with the strobo-stereoscopic imaging system 100 shown in FIG. 1, and shared features are labeled similarly in FIG. 5. Particularly, in this exemplary embodiment, FSS imaging system 350 generally includes the rotational drive 102 for rotating a device 30 having an outer surface 32 coated by a fluorescent material, the stroboscopic control module 120, an ultraviolet stroboscopic illuminator 360, a stereoscopic imaging unit 380, and the image reconstruction module 180. The function of the rotational drive 102, stroboscopic control module 120, and image reconstruction module 180 of FSS imaging system 350 is largely similar to their respective functions in the strobo-stereoscopic imaging system 100 described above, and thus their functionality with respect to FSS imaging system 350 will not be described in detail herein.

As described above, in this exemplary embodiment, the outer surface 32 of device 30 is coated with a fluorescent material in an effort to minimize or eliminate issues pertaining to specular reflection. Particularly, the fluorescent coating formed on the outer surface 32 of device 30 may produce a Stokes shift under certain conditions as will be discussed further herein, and may randomize the direction of electromagnetic radiation emitted from outer surface 32, allowing for the separation of specular reflection from an excitation wavelength which impinges upon the outer surface 32. The fluorescent coating may also increase speckle contrast to help improve reconstruction accuracy via the presence of a greater number of reference matching points in each pair of associated images (e.g., left and right images) produced by stereoscopic imaging unit 380. In this exemplary embodiment, the fluorescent coating comprises a mixture of fluorescent particles (e.g., Pylakrome LX-10215 particles provided by the Pylam Company) suspended in an oil providing an emission wavelength of been approximately 500 nanometers (nm) and 600 nm; however, it may be understood that the composition and configuration of the fluorescent coating formed on outer surface 32 may vary in other embodiments.

In this exemplary embodiment, ultraviolet stroboscopic illuminator 360 comprises an LED configured to produce electromagnetic radiation in at least the ultraviolet portion of the electromagnetic spectrum. For example, the illumination produced by ultraviolet stroboscopic illuminator 360 may have an excitation wavelength that is approximately between 300 nm and 400 nm; however, it may be understood that the configuration of ultraviolet stroboscopic illuminator 360 may vary in other embodiments.

In this exemplary embodiment, the stereoscopic imaging unit 380 of FSS imaging system 350 includes the pair of cameras 170 (e.g., CCD cameras 170) along with a pair of band-pass filters 382 positioned within the FOV of the pair of cameras 170. In this configuration, upon activation by the stroboscopic control module 120, ultraviolet stroboscopic illuminator 360 emits an ultraviolet excitation light 362 having an excitation wavelength that illuminates the device 30. At least some of the ultraviolet excitation light 362 is reflected off the coated outer surface 32 of device 30 as a reflected light 364 having wavelengths equal to an emissions wavelength that is greater than the excitation wavelength and an ambient wavelength that may be equal to or less than the excitation wavelength. The reflected light 364 passes through the pair of band-pass filters 382 as filtered light 366 which filters at least some of the light from the reflected light 364 having a wavelength that is less than the emission wavelength.

The difference between the relatively great emission wavelength of the filtered light 366 and the relatively small excitation wavelength of the ultraviolet excitation light 362 corresponds to the Stokes shift produced by the fluorescent coating as excited by the ultraviolet excitation light 362, and which may be equal to 200 nm or greater in magnitude in some embodiments. It may also be understood that the fluorescent may minimize the sensitivity of the stroboscopic illuminator 360 while highlighting the contrast, thereby increasing the number of reference points between a pair of associated images produced by the stereoscopic imaging unit 380. The viscous fluorescent coating has a scattering effect on the reflected light 364 which minimizes undesirable directional reflection intensity of the reflected light 364. The viscosity of the fluorescent coating may be of particular importance in maximizing the quality of the surface reconstruction produced by FSS imaging system 350, and the viscosity of the fluorescent coating is approximately equal to or greater than one to ten micrometers in some embodiments. While the fluorescent coating may introduce some ambient or environmental noise in the reflected light 364, such environmental noise may be filtered from the reflected light 364 to form filtered light 366 by band-pass filters 382 prior to the filtered light 366 being captured by cameras 170, thereby maintaining a high degree of contrast.

In some applications, it may be desirable to generate super-resolution stereoscopic images in a which a high-resolution image is reconstructed from cameras using machine learning algorithms. For example, real-time or online manufacturing inspection of electronic devices may demand a high degree of accuracy, precision, and spatial resolution in 3D surface profiling while retaining imaging features. However, conventional 3D imaging techniques capable of producing such super-resolution images typically rely on machine learning or artificial intelligence algorithms which often require prohibitively expensive computing resources. Accordingly, embodiments of image reconstruction processes executable by the image reconstruction module 180 of imaging systems 100 and 350 (as well as other embodiments of strobo-stereoscopic imaging systems) are disclosed herein which employs feature-selective segmentation (F-SS) in which raw 3D images, rather than being entirely enhanced at once, are adaptively segmented based on their given features. In this manner, desired structures or patterns within the 3D image may be recognized as a basis for the selective feature segmentation of the 3D image.

Figure 6:
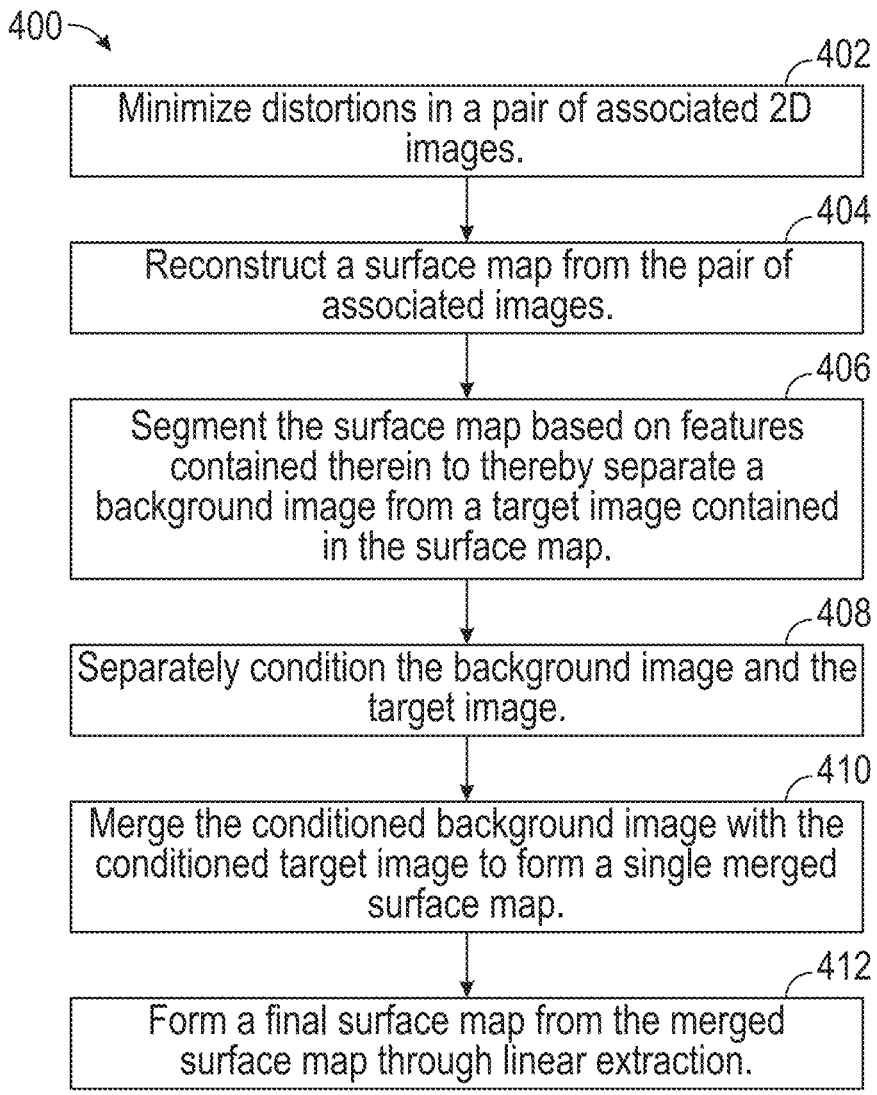
FIG. 6 is a flowchart of another embodiment of an image reconstruction process executable by a strobo-stereoscopic imaging system.

Referring now to FIG. 6, a flowchart is shown illustrating an exemplary image reconstruction process 400 employing F-SS and executable by an image reconstruction module of a strobo-stereoscopic imaging system such as the image reconstruction module 180 of imaging systems 100 and 350 described above.

Beginning at block 402, image reconstruction process 400 includes minimizing distortions to a pair of associated images captured by a stereoscopic imaging unit. For example, block 402 may include minimizing distortions in a pair of associated images captured by the cameras of the stereoscopic imaging unit 160 of the strobo-stereoscopic imaging system 100 described above. The minimization of distortions of the associated pair of images may include removing lens aberrations and other image distortions.

At block 404, image reconstruction process 400 includes reconstructing a 3D surface or depth map from the pair of associated images conditioned at block 402 of process 400. For example, block 404 may include the execution of at least some of the blocks 252-262 of the image reconstruction process 250 shown in FIG. 3 in which a surface map is reconstructed from an associated pair of 2D images using a strobo-stereoscopic imaging process as described herein.

At block 406, image reconstruction process 400 includes separating or segmenting the surface map based on features contained in the surface map whereby a background image or mask and a target image each contained in the surface map are separated from each other. At block 408, image reconstruction process 400 includes separately conditioning the background image and the target image separated at block 406 to form a conditioned background image and a conditioned target image. In some embodiments, block 408 includes separately applying a low-pass filter to the separated background image and to the separated target image to form a filtered background image and a filtered target image. At block 410, image reconstruction process 400 includes merging the conditioned background image with the conditioned target image to form a single merged surface map therefrom. At block 412, image reconstruction process includes forming a final surface map from the merged surface map through linear extraction.

Figure 7:
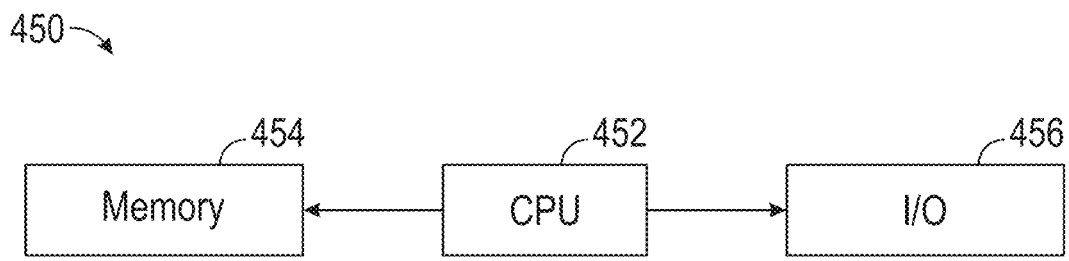
FIG. 7 is a block diagram of an embodiment of a computer system.

Referring to FIG. 7, an embodiment of a computer system 450 suitable for implementing one or more embodiments disclosed herein is shown. For example, components of imaging systems 100 and 350 shown in FIGS. 1 and 5 (e.g., stroboscopic control module 120, image reconstruction module 180) may be configured in a manner similar to the computer system 450 shown in FIG. 7. The computer system 450 includes a processor 452 (which may be referred to as a central processor unit or CPU) that is in communication with one or more memory devices 454, and input/output (I/O) devices 456. The CPU 452 may be implemented as one or more CPU chips. The memory devices 454 of computer system 450 may include secondary storage (e.g., one or more disk drives, etc.), a non-volatile memory device such as read only memory (ROM), and a volatile memory device such as random-access memory (RAM). In some contexts, the secondary storage ROM 454, and/or RAM comprising the memory devices 454 of computer system 450 may be referred to as a non-transitory computer readable medium or a computer readable storage media. I/O devices 456 may include printers, video monitors, liquid crystal displays (LCDs), touch screen displays, keyboards, keypads, switches, dials, mice, and/or other well-known input devices.

It is understood that by programming and/or loading executable instructions onto the computer system 450, at least one of the CPU 452, the memory devices 454 are changed, transforming the computer system 450 in part into a particular machine or apparatus having the novel functionality taught by the present disclosure. Additionally, after the computer system 450 is turned on or booted, the CPU 452 may execute a computer program or application. For example, the CPU 452 may execute software or firmware stored in the memory devices 454. During execution, an application may load instructions into the CPU 452, for example load some of the instructions of the application into a cache of the CPU 452. In some contexts, an application that is executed may be said to configure the CPU 452 to do something, e.g., to configure the CPU 452 to perform the function or functions promoted by the subject application. When the CPU 452 is configured in this way by the application, the CPU 452 becomes a specific purpose computer or a specific purpose machine.

Figure 8:
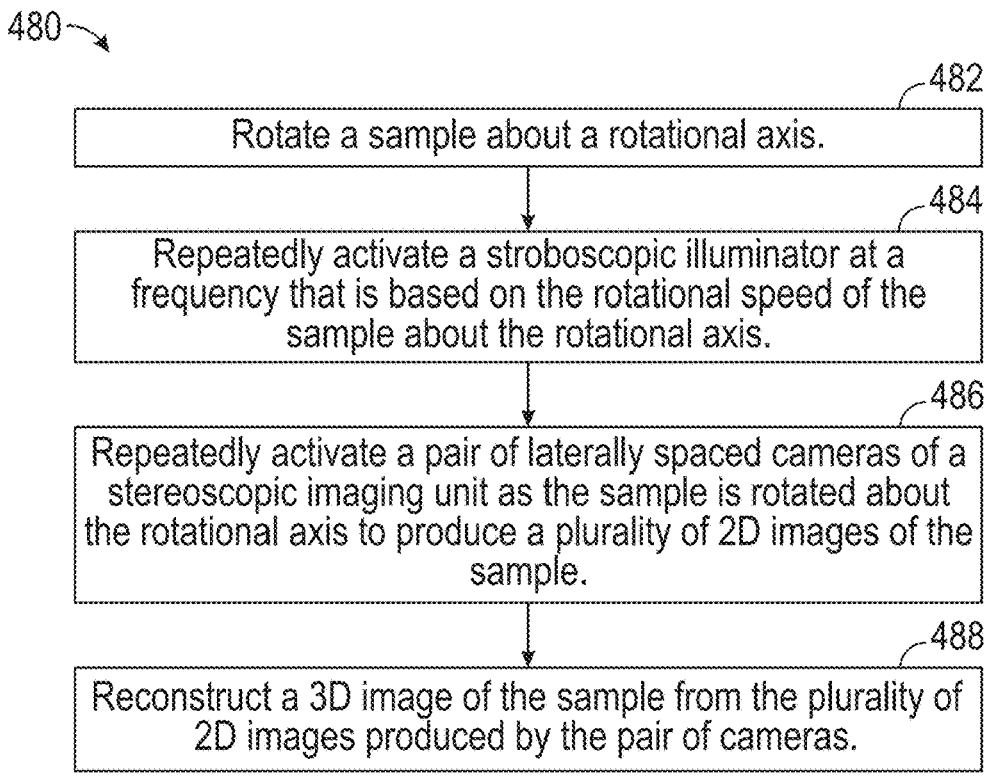
FIG. 8 is a flowchart of an embodiment of a method for reconstructing a 3D image from a sample.

Referring now to FIG. 8, a flowchart of a method 480 for reconstructing a 3D image of a sample is shown. Beginning at block 482, method 480 includes rotating the sample about a rotational axis. At block 484, method 480 comprises repeatedly activating a stroboscopic illuminator at a frequency that is based on the rotational speed of the sample about the rotational axis. At block 486, method 480 comprises repeatedly activating a pair of laterally spaced cameras of a stereoscopic imaging unit as the sample is rotated about the rotational axis to produce a plurality of 2D images of the sample. At block 488, method 480 comprises reconstructing a 3D image of the sample from the plurality of 2D images produced by the pair of cameras.

Experimental studies were conducted for reconstructing 3D images, such as surface maps, using strobo-stereoscopic imaging systems having features in common with the imaging systems 100 and 350 described herein. However, it may be understood that the following experiments described herein are not intended to limit the scope of this disclosure and upon the embodiments described above and shown in FIGS. 1-7.

Figure 9:
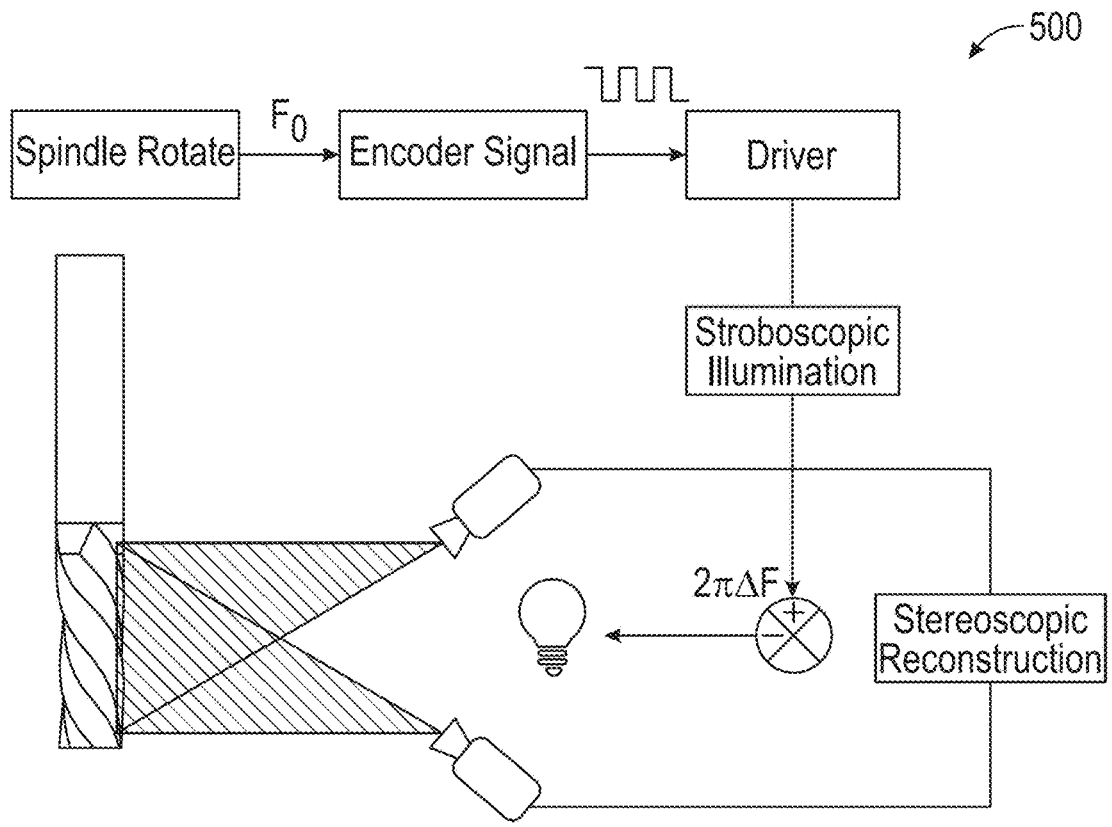
FIG. 9 is a schematic view of an experimental setup.

Particularly, in an experimental study stroboscopy and stereoscopy processes were combined to measure the 3D images of a cutting tool while in motion. Referring to FIG. 9, the experimental setup 500 employed in this experimental study is shown. While the stereoscopy algorithm can provide a 3D image at a specific measurement position, the phase-shifting of the strobo-light allowed the whole-view reconstruction of the cutting tool while the tool is rotating with a frequency $F_0$. The encoder signals from the spindle rotation were applied for the stroboscopic light control, so the specific area of the cutting tool could be illuminated by blinking the LED light. The illumination system and camera system were synchronized with the spindle motion. The measurement operations were automated and digitalized by the LabVIEW graphical development system (provided by National Instruments Corp.) and the MATLAB computing environment (provided by MathWorks, Inc.).

The stroboscopic instrument is typically applied for the measurement of fast-moving objects. The operation principle is as follows: when synchronizing the light source illumination frequency and the motion of the object, the object appears to be stationary. If minor differences are added to the frequency, the object appears to be slowly moving or rotating. This slow-motion can be working as the source for the phase-shifting; with this phase information, the target can be whole-view 3D reconstructed by 360 degrees. In this experimental study, the encoder index (Z) from the spindle motion was applied as the trigger for the LED light, as it represented the end of one cycle of a rotary motion. When the proposed technique was operated under the phase-locked mode, no delay information was implemented to the system. On the contrary, when the system worked under the phase-shifting mode, a delay signal related to the spindle working RPM (revolution per minute) and desired stitched map number were added.

In this experimental study, the stereoscopic technique was embedded with two CCD cameras capturing images located bilaterally symmetrically regarding the target. By applying the triangulation, lens equation, and aberration elimination method, the 3D scene was reconstructed by the location information of the same object points from both the left and right images. Camera 1 and 2 of the experimental setup 500 were provided with their own coordinate system on the CCD frame and the same (f), which is the focal length of the lens system. Additionally, a stereo camera calibration was performed to determine the intrinsic and extrinsic camera parameters or the projection matrix coefficients of the system. These parameters transferred the scene points in 3D space to their corresponding image points, permitting for the recovery of] the measured depth. In this experimental study, calibration was performed with the same camera systems for the target sample measurement.

The Stereo Camera Calibrator app in MATLAB was applied to the calibration process, and images of calibration checkboard pattern at different orientations related to the cameras were taken by the stereoscope system of experimental setup 500. Additionally, a 3D printed reference array was prepared including a plurality of cylinders each having an approximately 4 millimeter (mm) diameter and an approximately 4 mm height. The reference array was applied as a reference target to prove the 3D surface reconstruction process.

Figure 10:
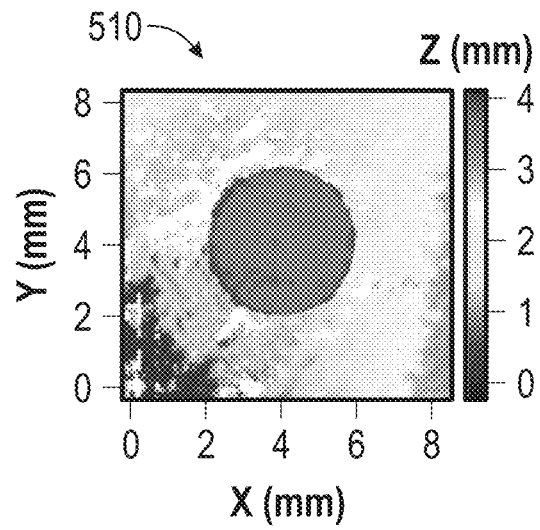
FIG. 10 is graph depicting an initial surface map.
Figure 11:
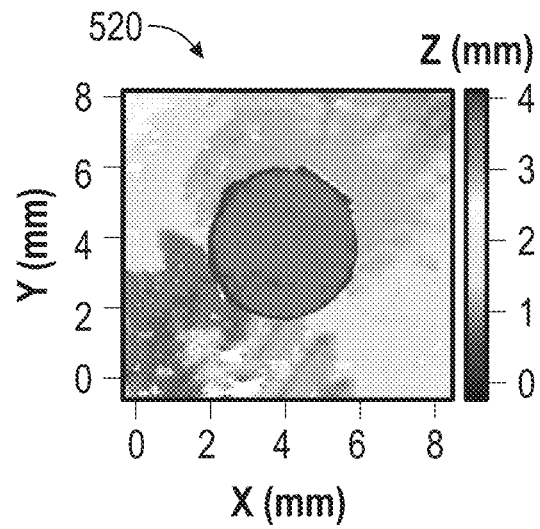
FIG. 11 is a graph depicting a filtered surface map.

Referring now to FIGS. 10 and 11, FIG. 10 illustrates an initial surface map 510 of one of the cylinders of the reference array reconstructed by the experimental setup 500 while FIG. 11 illustrates a filtered or conditioned surface map 520 formed from the initial surface map 510. The surface maps 510 and 520 were based on the stereoscopic method. Specifically, after gathering the surface map 510, a system error removal process was applied to remove the unbalanced information from the initial surface map 510. Particularly, a gaussian filter was applied to decrease the noise level and smooth the surface map. Once the filtered surface map 520 was obtained, the validation of the surface map 520 was performed.

Figure 12:
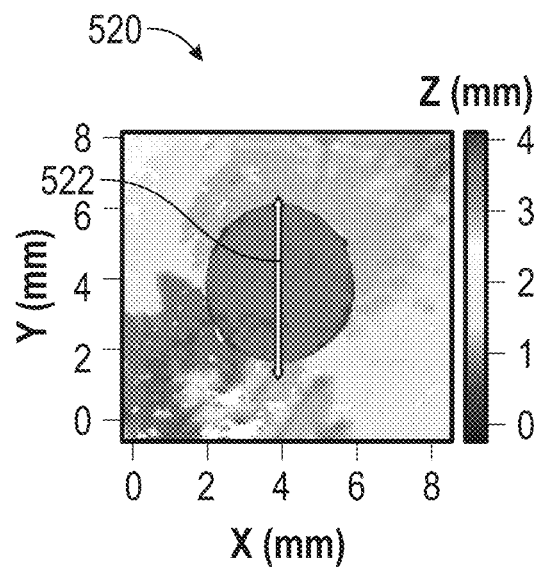
FIG. 12 is a graph depicting a linear measurement of a filtered conditioned surface map.
Figure 13:
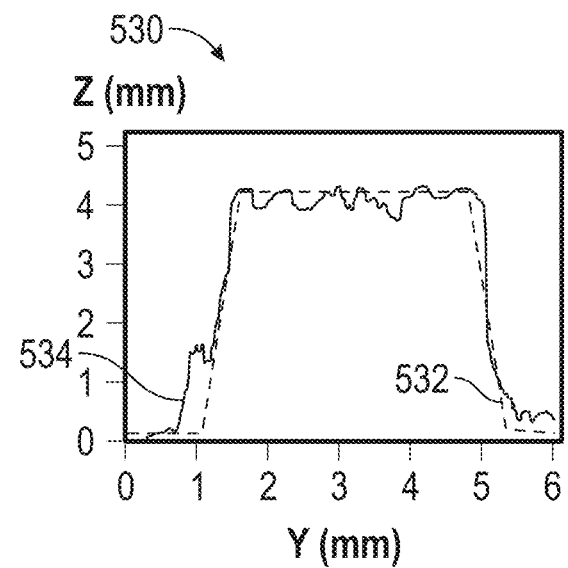
FIG. 13 is a graph depicting a dial-gauge measurement.

Specifically, in this experimental study, linear measurement results were extracted from the filtered surface map 520. Referring now to FIGS. 12 and 13, FIG. 12 illustrates the linear measurement 522 of the filtered surface map 520. FIG. 13 is a graph 530 depicting a conventional dial-gauge measurement 532 of the cylinder of the reference array compared with the linear measurement 522 extracted from the filtered surface map 520. The linear measurement 534 had an average height (z) of approximately 4.08 mm. Because the cylinder was 3D printed in this experimental study by fused deposition modeling, the printing patterns were also observed in the linear measurement 534. The height discrepancy of the two measurements 532 and 534 methods showed only 1.7%.

In this experimental study, the phase-locked and phase-shifting algorithm synchronized the rotational speed RPM (revolution per minute) with the light blinking frequency and shifted the phase of the light signal from 0 to 360 degrees. Additionally, the phase-shifting scan method by stroboscopic control algorithm was programmed in the LabVIEW environment. The rising edge of the Encoder index (Z) signal was used in this experimental study to signal that the whole cycle of rotation is finished. This signal is related to the rotational speed (RPM), and F is the desired LED blink frequency in Hz. When F was equal to the spindle rotary frequency, both CCDs gathered pictures at a single location of the cutting tool. This was also referred to as the phase-locked mode.

Figure 14:
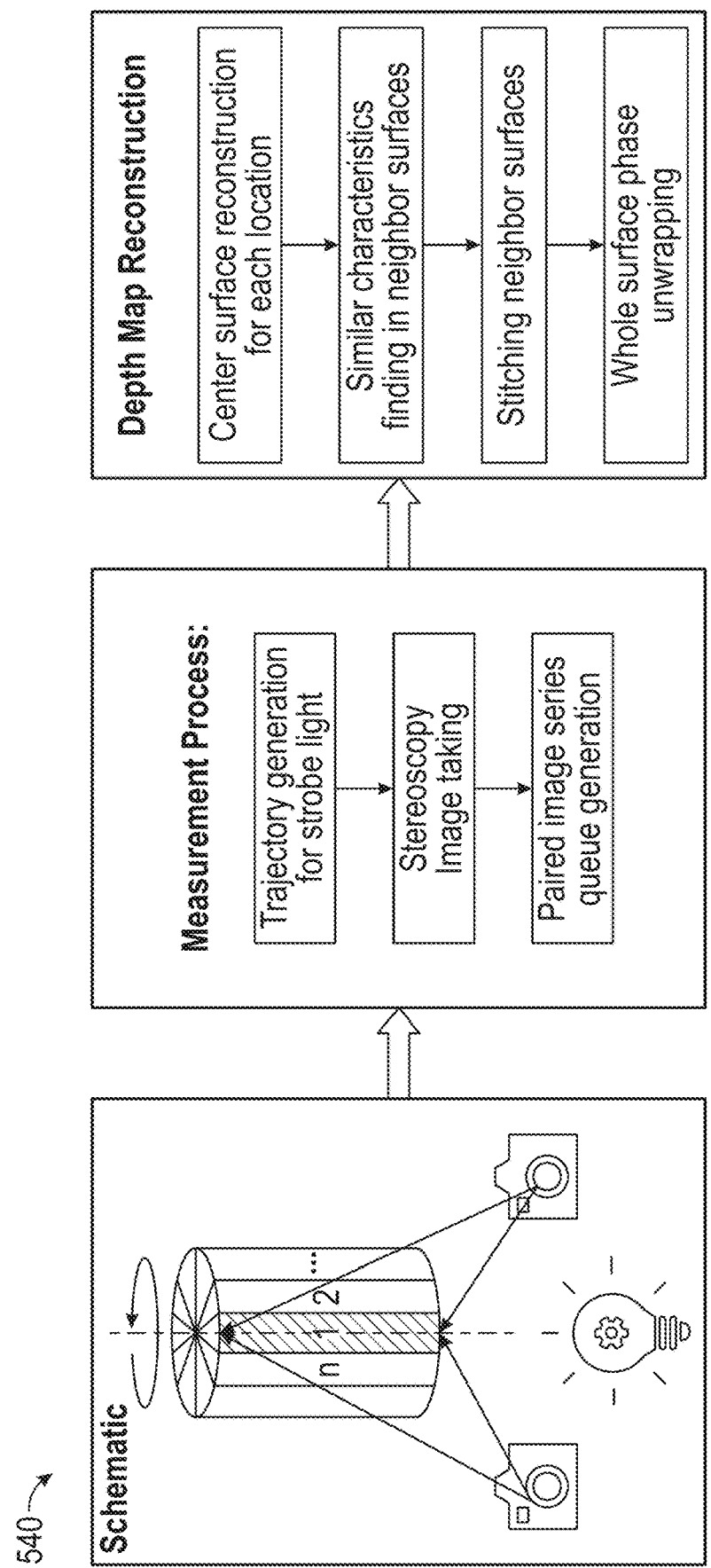
FIG. 14 is a block diagram of a surface map reconstruction process.

When F was different from the spindle rotary frequency (referred to as the phase-shifting mode), which means a delayed time T was introduced into the system, a sequence of images was gathered under the phase-shifting process for a whole-view 3D reconstruction. To gather a whole-view 3D surface map, after the phase-shifting process, a stitching algorithm for the surface map reconstruction was required. Referring to FIG. 14, a block diagram 540 is shown illustrating the measurement and surface map reconstruction processes utilized in this experimental study.

Referring again to FIG. 9, in this experimental study, to minimize the rotational motion error induced effect, the aerostatic spindle (rotational error<0.1 µm) with 2048 steps per cycle (encoder signal) was applied, and working under a velocity control mode to secure the motion accuracy and rotational speed. In this experimental study, two CCDs (30 frames per second) with lenses (field of view: 18×24 mm) were installed on two linear rails (x and z-direction) with rotary stages to capture the raw picture of a cutting tool for further 3D reconstruction. Cross lasers on top of each CCD camera were added to guarantee both cameras focus at the exact location of the measurement target. Additionally, an end mill tool was used as the experimental target.

Phase-Locked Mode

Figure 15:
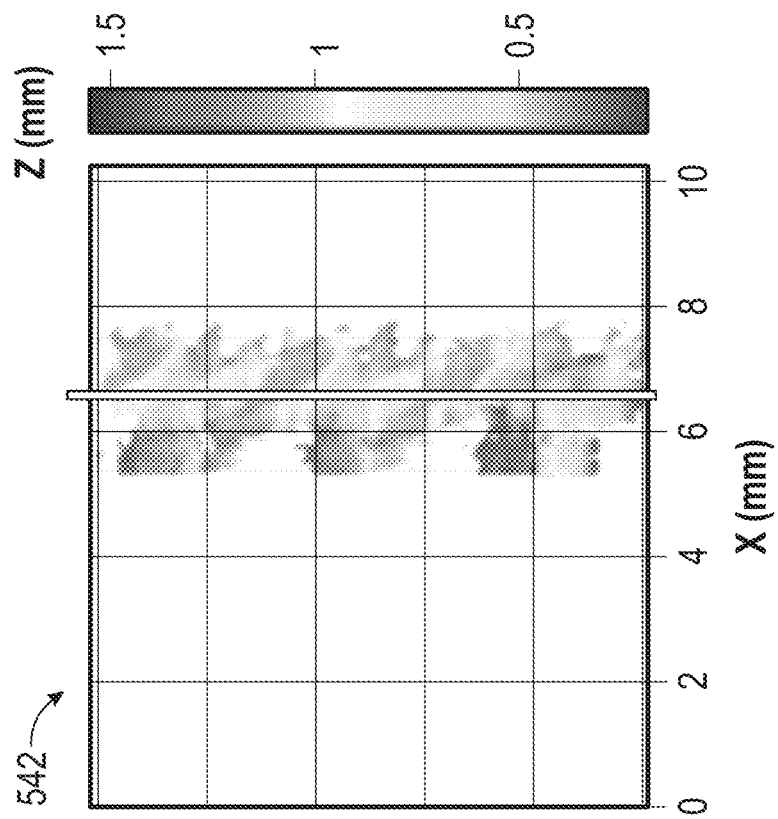
FIG. 15 is a graph depicting a pair of surface maps reconstructed from a phase-locked mode.
Figure 15:
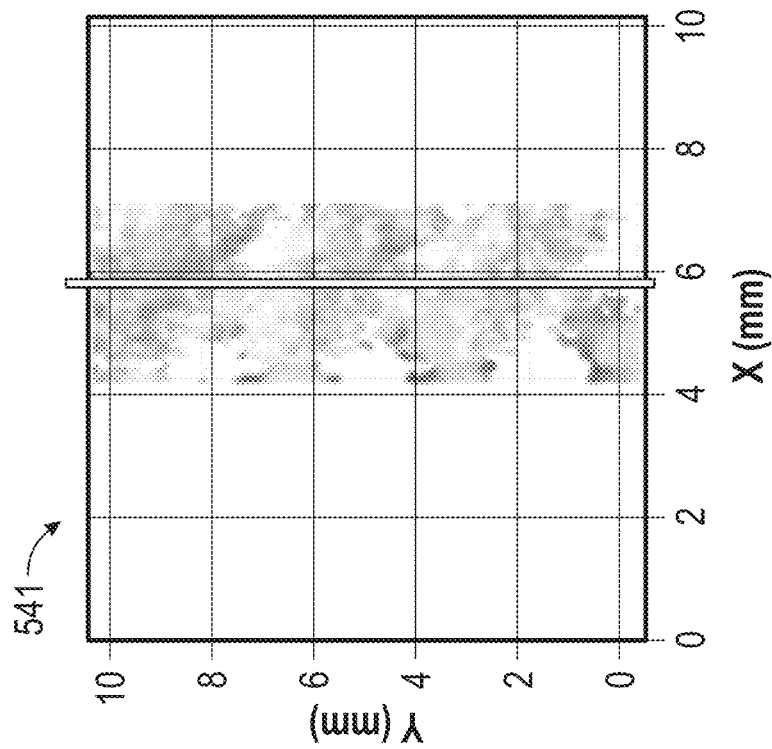
Figure 16:
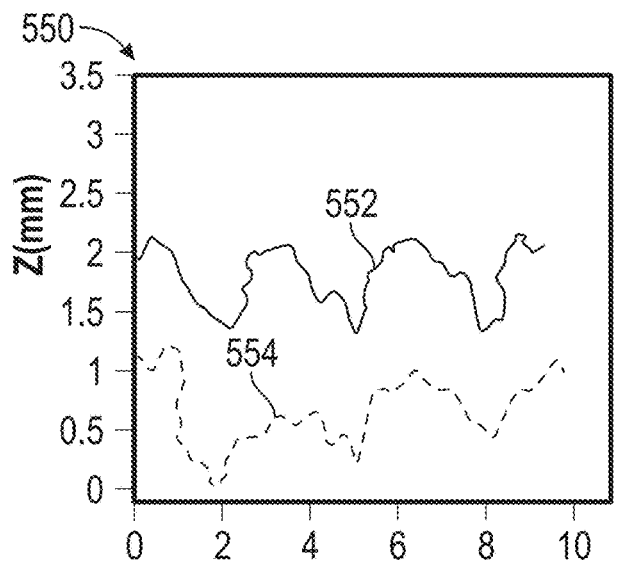
FIG. 16 is a graph depicting measured height based on the surface maps of FIG. 15.

The developed strobo-stereoscopy measured the cutting tool geometry under 90, 360 RPM. Referring now to FIGS. 15 and 16, FIG. 15 illustrates a pair of surface maps 541 and 542 reconstructed from a phase-locked mode with the end mill tool rotated at 90 RPM (surface map 541) and at 360 RPM (surface map 542). FIG. 16 is a graph 550 illustrating the measured height at 90 RPM (indicated by numeral 552) and at 360 RPM (indicated by numeral 554) based on the surface maps 541 and 542, respectively. The similar pattern on the center linear scan can be observed.

For each working condition, five raw images were captured, and the averaged information from the raw images was used to reconstruct the surface map. These results provided the ability to measure the surface roughness on the edge and flute of the cutting tool. Most microscopic camera systems have limited performance on the collection of stray light. Vertical linear measurements were applied on the surface map to validate the surface map reconstruction repeatability. The average values and the deviation values of the detected depth of grooves (D) and detected length of groves (H) under each working RPM are presented below in Table 1.

TABLE 1

Vertical linear measurements results under different working RPM.

| Rotation speed | H (mm) | | D (mm) | |
| --- | --- | --- | --- | --- |
| | Average | Deviation | Average | Deviation |
| 90 RPM | 3.03 | 0.14 | 0.67 | 0.08 |
| 360 RPM | 2.84 | 0.14 | 0.83 | 0.08 |

The H and D values were also measured by digital caliper at 2.91 mm and 0.87 mm, respectively. The results of this experimental study provide the ability to track the tool surface geometry characteristics. The deviation resulted from the cutting tool geometry, although a few micrometer-scale deviations due to CCD camera pixel size could have been involved. From the results, it may be noted that the deviation value remains the same for both 90 and 360 RPM condition, which represents the stable performance of the proposed technique. However, the different average value exits, and this derived from the quality of the "frozen image" under different working RPM. From the results, it is obvious that the deviation value remains.

Phase-Shifting Mode

From the phase-locked mode results, when working RPM was 90, the reconstructed surface map showed the most complete results among other tests of this experimental study. Thus, the cutting tool was rotated under 90 RPM for the phase-shifting mode experiment, and the desired number of images per cycle was set at 18 (20-degree imaging interval).

Figure 17:
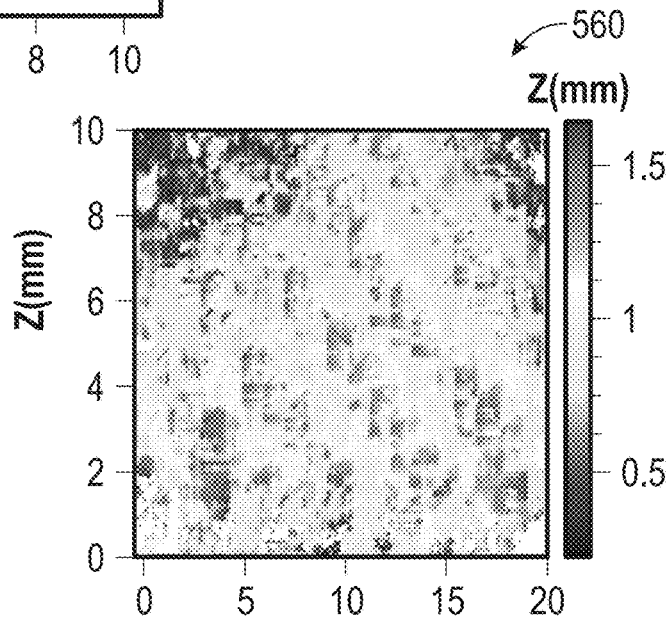
FIG. 17 is a graph depicting reconstructed whole-view surface map.
Figure 18:
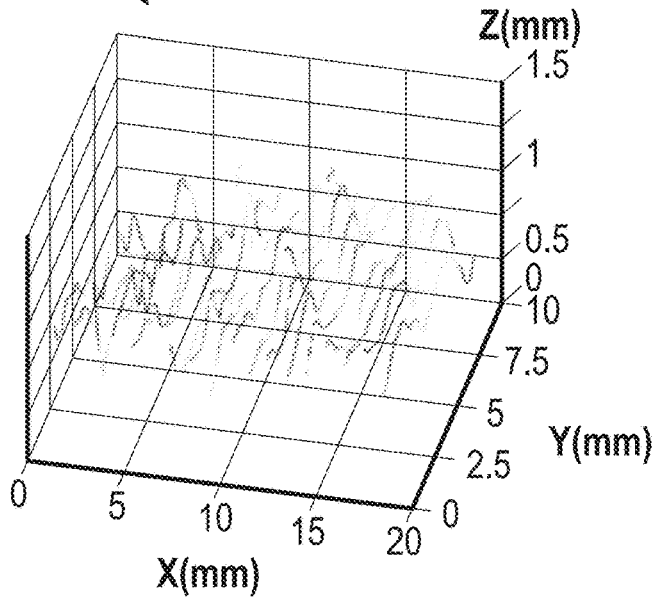
FIG. 18 is a graph depicting a reconstructed vertical wave-fall map.

The center surface reconstruction was based on the stereoscopic algorithm. Before the depth map was recovered, pre-process for target centering, distortion removal, and brightness adjustment needed to be performed. A Gaussian filter was applied to remove system noise. For the neighbor surfaces stitching process, SIFT (scale-invariant feature transform) was used to determine the similar characteristics first, as they provided reference information. After the stitched whole-view or panorama surface was generated, a whole surface phase unwrapping process was applied to remove the stitching errors. Referring now to FIGS. 17 and 18, FIG. 17 is a reconstructed whole-view or panorama surface map 560 while FIG. 18 is a reconstructed vertical wave-fall map 570 of the cutting tool imaged during this experimental study.

As described above, this experimental study was performed on an end mill tool (ø⅛"), and included two working modes: phase-locked and phase-shifting modes which were simultaneously operated. The phase-locked mode process showed the possibility of reconstructing the surface geometric information, such as surface roughness and shape, and the tracking of surface characteristics, such as the groove depth and length. The phase-shifting mode showed the whole-view surface map reconstruction ability provided by the experimental setup 500.

An additional experimental study was conducted in which green fluorescence dye-doped fluid was used to suppress strong specular reflection, and the full field of imaging of a target surface rotating was in-process obtained by fluorescence strobo-stereoscopy (FSS).

The fluorescent dye has two intrinsic characteristics. One is the Stokes shift, which occurs when the dye is activated by a certain ultraviolet light. Its emission wavelength is shifted and does not overlap with the excitation wavelength. When the fluorescent liquid is applied to the surface, its emitted direction is random. Thus, along with the band-pass filter, specular reflection from the excitation wavelength can be separated. The other advantage is the ability to increase speckle contrast, which helps improve reconstruction accuracy for the presence of more reference matching points in the pair of images.

Figure 19:
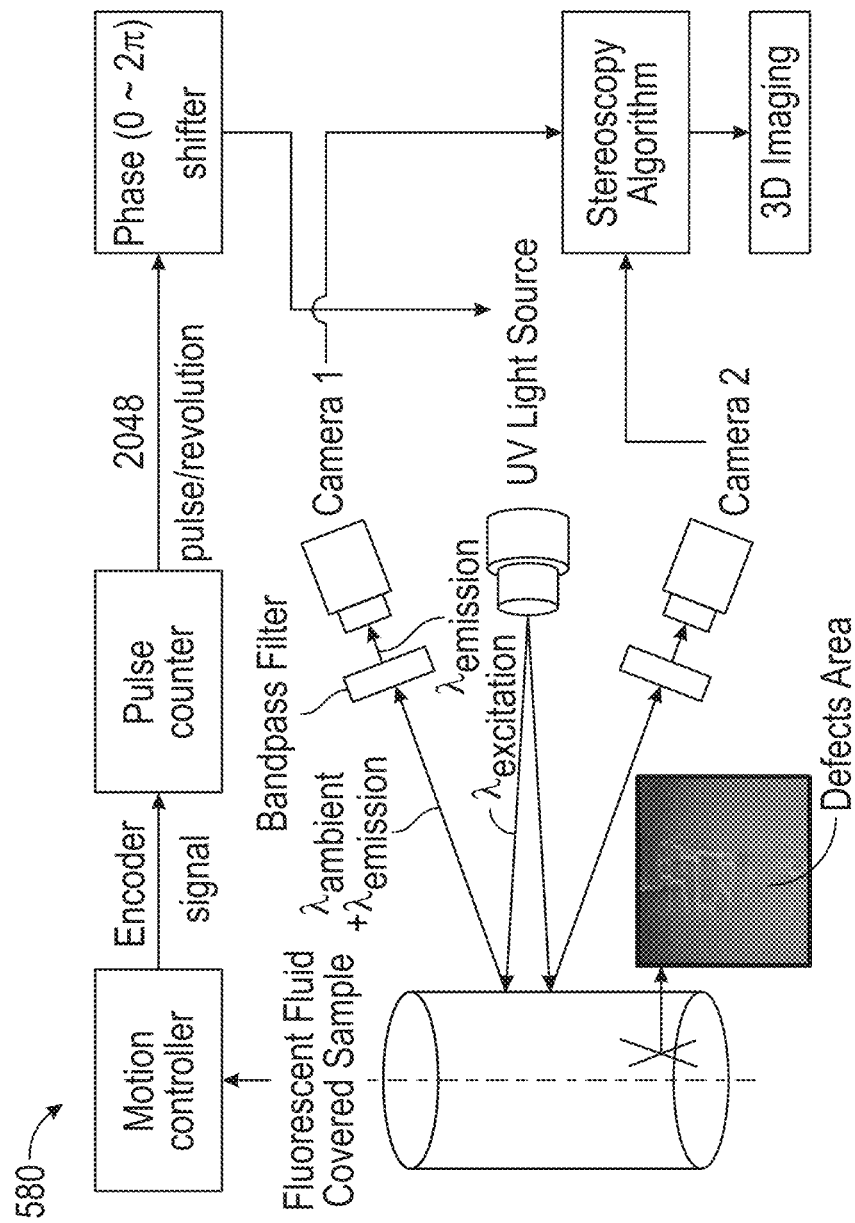
FIG. 19 is a schematic view of another experimental setup.

Referring now to FIG. 19, FIG. 19 illustrates schematically the experimental setup 580 for this experimental study. Prior to the measurement, the fluorescent fluid was chosen as the mixture of Pylakrome LX-10215 particles (from Pylam Co.) and fluorescent fluid PAG 150 oil. The excitation wavelength of the LED light source was chosen as 365 nm and the emission wavelength measured by the spectrometer was 520 nm (central peak value).

Figure 20:
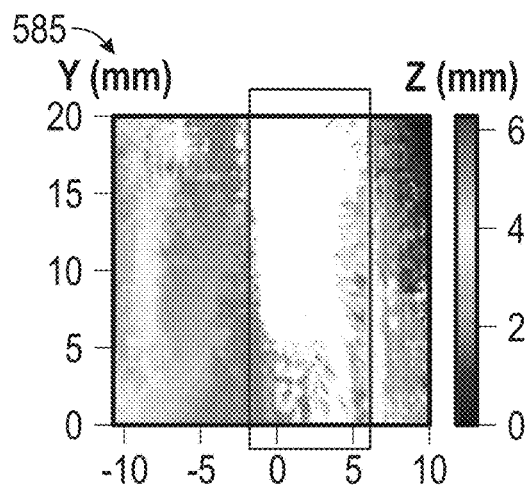
FIGS. 20-24 are graphs depicting separate reconstructed surface maps.
Figure 21:
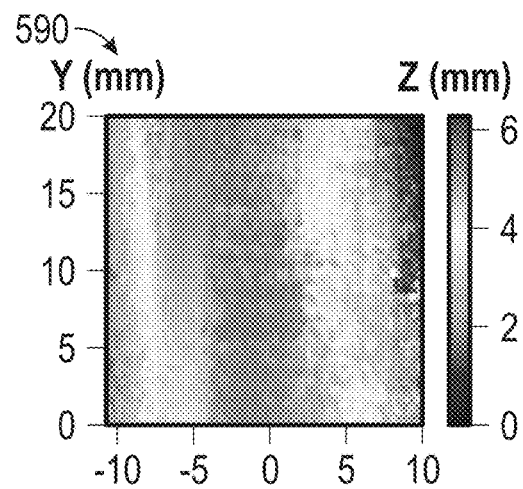

In the experimental setup 580, a pair of charge-coupled device (CCD) cameras were employed for the image capturing, a 365 nm ($\lambda_{excitation}$) ultraviolet light was prepared for the excitation light source, a pair of high-pass filters (BPF>370 nm) were chosen from the emission wavelength 520 nm ($\lambda_{emission}$) of the fluorescent fluid, and a rotary spindle was used for the target rotation. Using the fluorescent fluid can remove the sensitivity of the illumination system while highlighting the contrast, hence increasing the number of reference points, and the fluorescent fluid was sprayed to the surface in a spray bottle while the target sample is rotating. Referring now to FIGS. 20 and 21, reconstructed surface maps 585 and 590 of a machined aluminum rod (ø 1") are shown in FIGS. 20 and 21, respectively, where surface map 585 was generated without the use of fluorescent fluid and map 590 was generated using fluorescent fluid. Surface maps 585 and 590 demonstrate that the fluorescent liquid can improve the optical quality-surface map reconstruction ability.

It was noted during this experimental study that a higher viscosity fluid on the surface can reduce the specular effect. Comparison experiments on the targets with a rough surface and a polished surface were conducted between normal LED conditions and ultraviolet light conditions with fluorescent fluid. These results demonstrated that the fluorescent fluid is capable of reconstructing the specular effect that existed on the surface. After this, the patterned structure target was measured to first track the FSS single image reconstruction ability on the pattern recognition, and to demonstrate the whole view reconstruction process. Finally, the cylindricity and roundness of the reconstructed 3D target were compared with the baseline data obtained by using the coordinate measuring machine (CMM).

Figure 22:
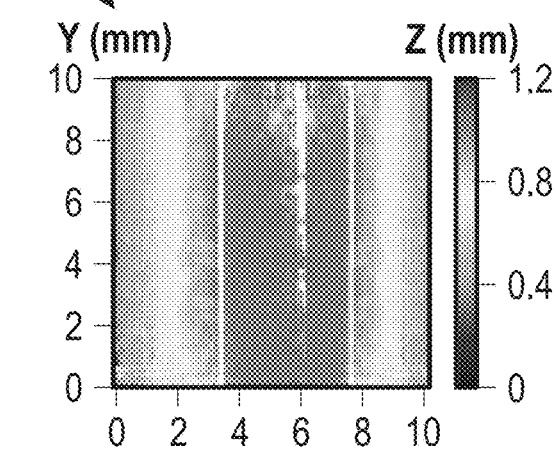
Figure 23:
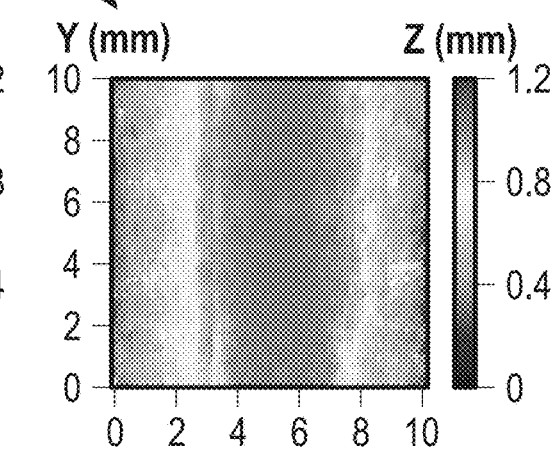
Figure 24:
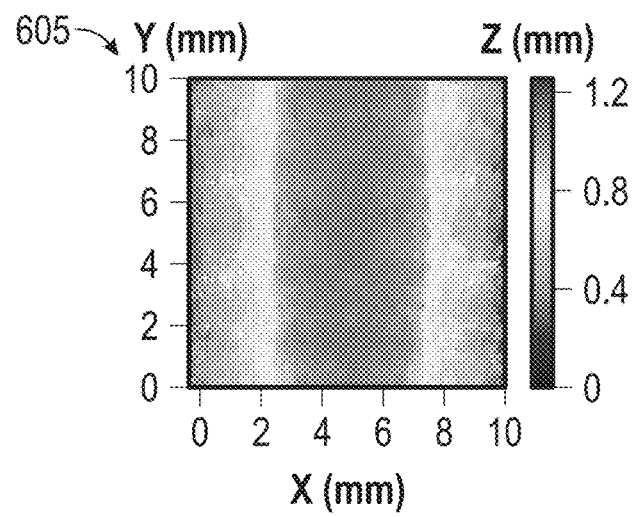
Figure 25:
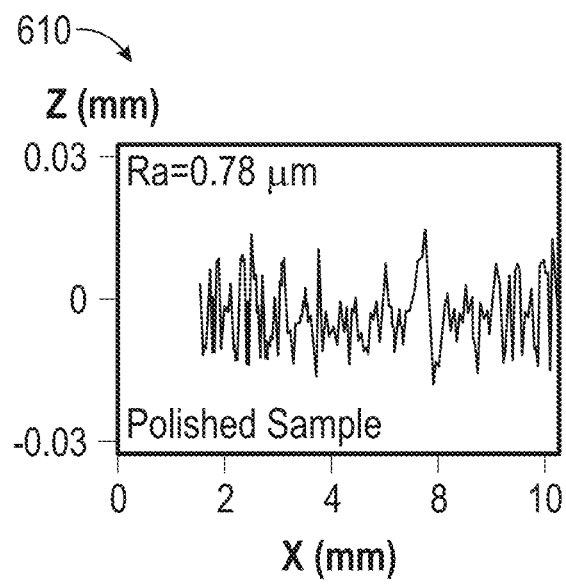
FIGS. 25-28 are graphs depicting surface depth based on a reconstructed surface map.
Figure 26:
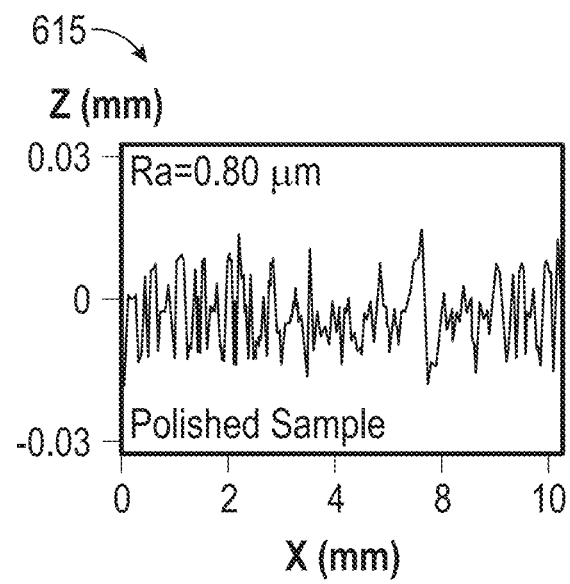
Figure 27:
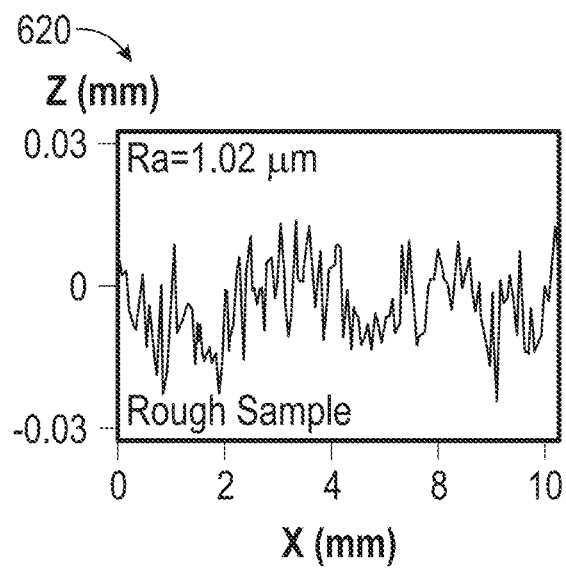
Figure 28:
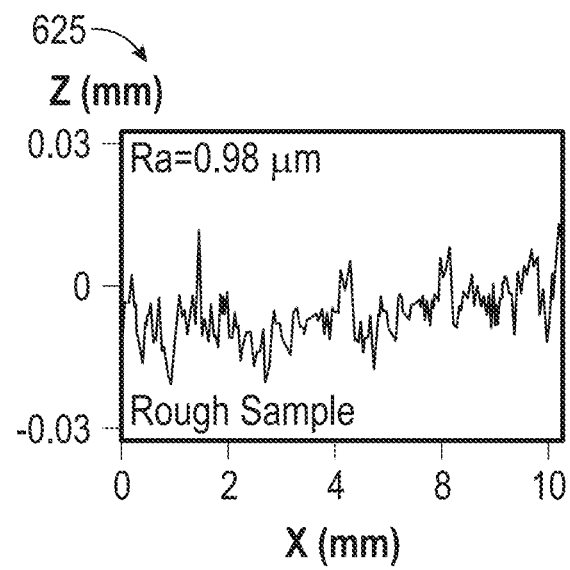

To test the fluid media effect on the well-machined surface, stereoscopic experiments were constructed. The three different mediums (air, water, lubricant liquid) were applied to the polished cylinder. Referring to FIGS. 22-24, reconstructed surface maps 595, 600, and 605 of the polished cylinder are shown in FIGS. 22-24, respectively, where surface map 595 was generated using air, surface map 600 was generated using water, and surface map 605 was generated using lubricant liquid.

According to the results shown in FIGS. 22-24, the liquid-applied casings could collect information about the blank area caused by the specular effect. In comparison to the other two situations, the lubricant liquid-coated surface diffused the most specular light. This is illustrated by the findings of surface maps 595-605, which shows that the lubricant liquid-coated surface was capable of reconstructing the complete surface map while being least affected by specular light relative to air and water. The water condition of surface map 600 is not lacking information; yet, the noncontinuous strokes along the specular light area demonstrate that such a rebuilt surface was impacted by the light distribution. The results indicated that the general liquid can assist reduce the specular effect, and that liquids with a higher viscosity result in a smoother surface quality.

The tool mark, however, is the least clear in the lubricant case (surface map 605) and less clear in the water case (surface map 600) compared with the air case (surface map 595). Thus, the scattering effect from the general liquid helps reduce the directional reflection intensity. The viscosity value is critical as it affects the quality of the surface reconstruction. However, such liquids can result in a blur or even a halo on the surface as it may reduce the contrast at the same time. As a result, fluorescent media was applied directly to remove the specular effect without introducing irrelevant environmental noises. Fluorescent liquid absorbs the incident wavelength and converts it to another. By additionally employing a band-pass filter, it was possible to minimize directional reflections while maintaining or even increasing the target area contrast.

Rough surface quality and the polished surface on the aluminum cylinder quality were also compared in this experimental study. Referring to FIGS. 25-28, FIGS. 25-28 include graphs 610, 615, 620, and 625, respectively, of surface depth (based on reconstructed surface maps generated by experimental setup 580) of a polished sample (graphs 610 and 615) and of a rough sample (graphs 620 and 625). Additionally, graphs 610 and 620 were obtained without the use of fluorescent fluid while graphs 615 and 625 were obtained using fluorescent fluid on the polished and rough samples, respectively.

The arithmetic average (Ra) value was also calculated by the absolute values of the profile height deviations from the mean line as indicated in graphs 610-625. The Ra values measured on the normal LED and the fluorescent liquid cases for the polished surface case (graphs 610 and 615) were 0.78 µm and 0.8 µm, respectively, and the direct difference ratio was 2.6%. Even though this difference was slight, the reconstruction ability under the normal LED case limited due to the blank section. This is because of the specular light effect. For the rough surface, the measured results were 1.02 µm and 0.98 µm for the normal LED and the fluorescent liquid case (graphs 620 and 625), respectively, with the variation of 3.9% variation.

Figure 29:
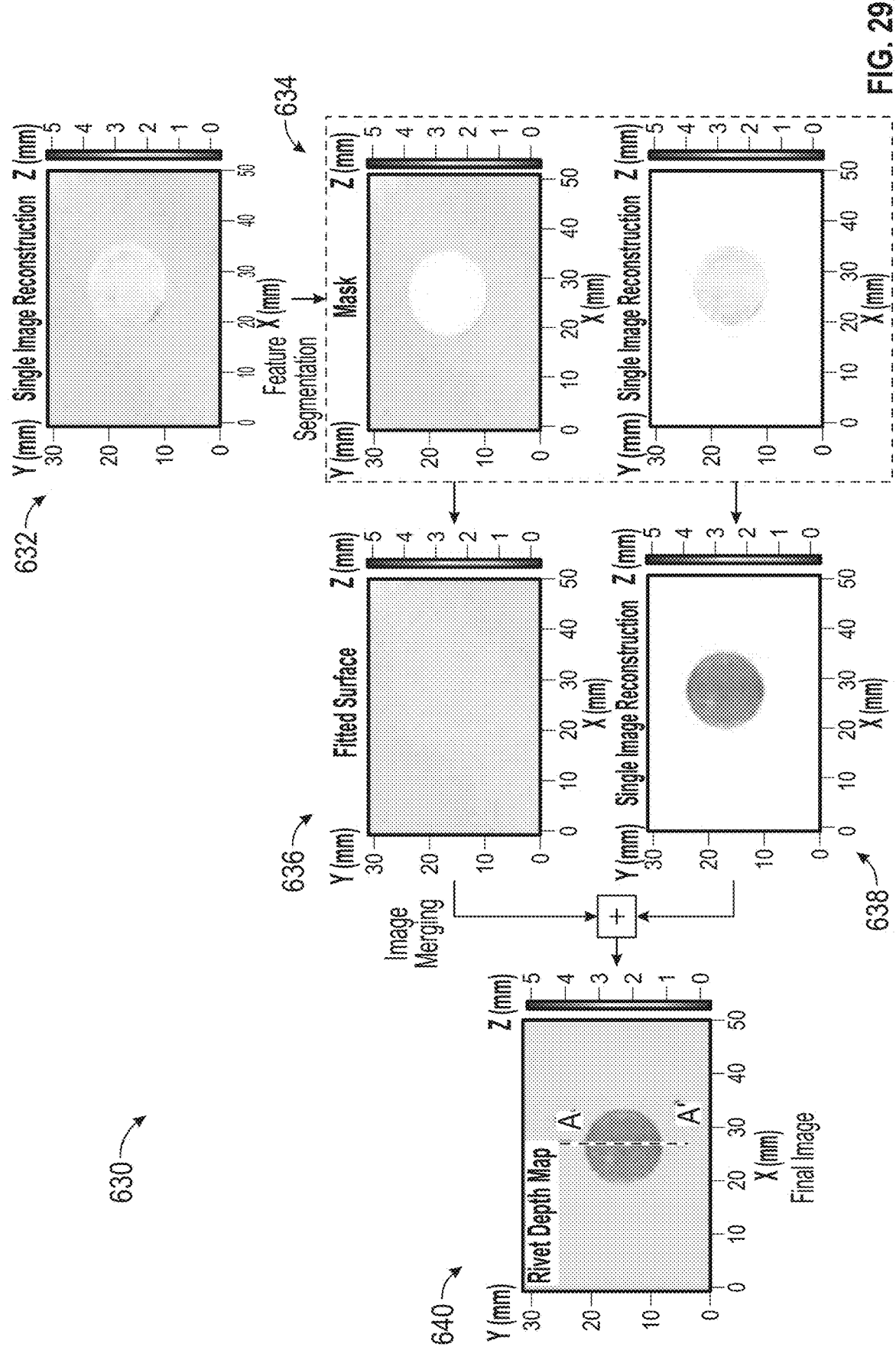
FIG. 29 is a block diagram of a feature-selective segmentation merging process.

A further experimental study was conducted in which stereoscopy was employed for 3D imaging, and a feature-selective segmentation (F-SS) method was tested on the stereoscopic system. Referring to FIG. 29, a block diagram 630 is shown illustrating the F-SS and merging method employed in this experimental study. The Stereo Camera Calibrator app in MATLAB was used for the calibration of the cameras of the experimental setup. The F-SS and merging method was achieved by the following steps in this experimental study: (1) lens aberration was removed to eliminate the image distortion; (2) 3D reconstructed surface maps were made (indicated by block 632) by the stereoscopic technique with the aberration-removed image pair; (3) the image was separated (indicated by block 634) based on the features so that the background image and target image could be independently processed, (4) lowpass filter was applied first for the background and target image surface fitting (indicated by blocks 636 and 638); (5) two featured images were merged back to get the 3D image, and high-pass filter was applied for the noise deduction; (6) the 3D image and profile were achieved by linear extraction (indicated by block 640).

The F-SS method was validated with a simple structure (ø 10 mm and thickness 2 mm), and showed good spatial resolution. The features were transformed into masks that selectively separated the features and background images for segmentation. Two different features were used to validate and evaluate the F-SS performance in this experimental study. The final image and the A-A' profile shown in FIG. 29 showed that the 3D image was successfully obtained. As a result, the FSS and merging method improved the 3D reconstructed image that is spatially resolved while preserving imaging features.

Figure 30:
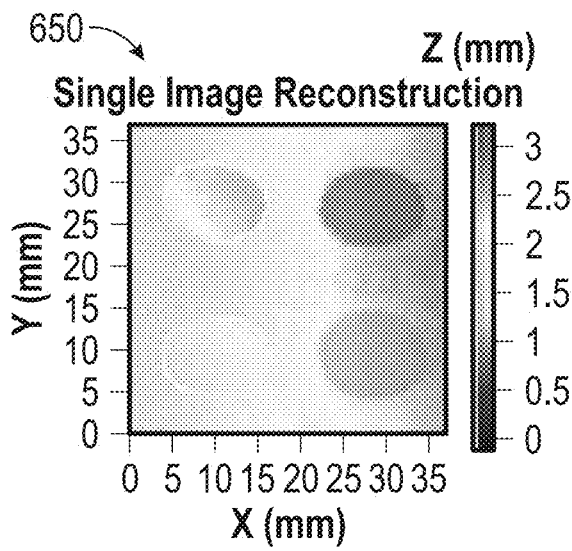
FIG. 30 is a graph depicting a single reconstructed surface map.
Figure 31:
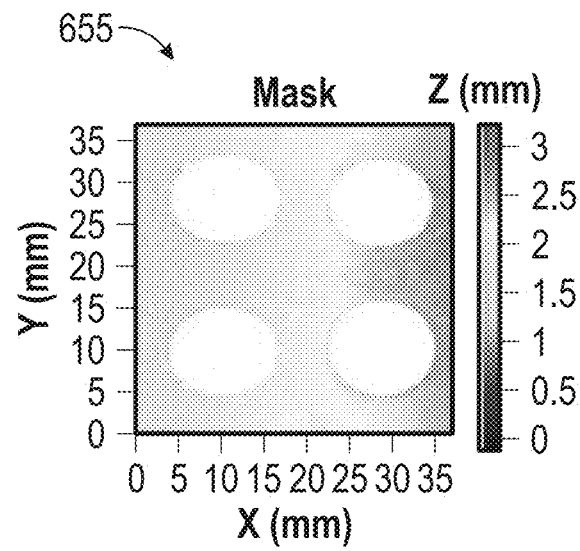
FIG. 31 is a graph depicting a separated background or mask.
Figure 32:
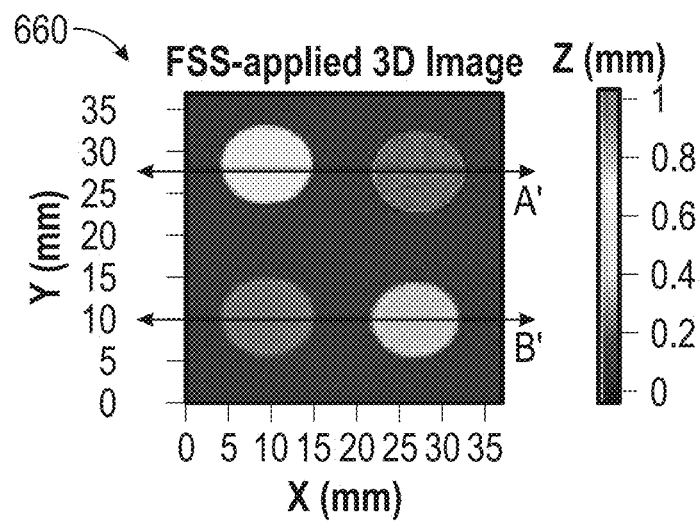
FIG. 32 is a graph depicting a surface map reconstructed using a feature-selective segmentation process.

Referring to FIGS. 30-33, a single reconstructed surface map 650 of the imaged sample is shown in FIG. 30, a mask 655 of the separated background is shown in FIG. 31, and a final F-SS reconstructed surface map 660 is shown in FIG. 32. The single reconstructed surface map 650 was obtained by the stereoscopic methods on the distortion removal images. The information of each pattern is related to the base structure, thus F-SS method was applied to remove such effect. By identifying the circular pattern's radius and center location, mask 655 could be generated to separate the background and target information. A fitted background was generated by the band-pass filter combined with the low-pass filter and the high-pass filter was applied after the merging process. Each of the pattern information was extracted from the base structure. The F-SS surface map 660 was compared with the general band-pass filtered method, the gaussian-filtered method and reference measurement by the laser displacement sensor with 20 vnm resolution.

Instead of separating the target information from the background, the conventional filtering method was based on the polynomial method to find the best fitted plan to the stereoscopic reconstructed map, and then extract the pattern features. This method can present the target location and rough depth information, but the cross-talk effect between the pattern and base structure exists. The pattern profiles by the band-pass-filtered 3D imaging also showed a significant discrepancy with those of the laser displacement sensor. The Gaussian filter to the base structure was applied here for the comparison as well. This method can extract the pattern information but the edge effect, which is the noise information from the edge of image frame, exists, and can be observed from the single surface map 650. The same high-pass filter was applied to remove the environmental noise for both methods.

This result shows that the filtering process applied to all features, including the patterns and background, involves the data, and band-pass filtering of the images involves data loss and lowers the spatial resolution of the image. The surface profiles of the FSS-applied 3D imaging method showed good agreement with the laser displacement sensor output of the experimental setup, and the discrepancy was estimated at less than 1%. This result indicates that the 3D reconstructed image was spatially resolved by automatically recognizing and segmenting the features on the 2D images, locally and adaptively applying a super-resolution algorithm to the segmented images based on the classified features, and then merging those filtered segments. As a result, the F-SS and merging method was confirmed to significantly enhance the spatial resolution of the 3D stereoscopic images while preserving imaging features.

In this experimental study, in order to stitch the neighboring images conveniently and efficiently, the F-SS method were applied to the raw reconstructed surface map, thus the curve information from the base structure could be removed with only the target information remaining. The whole-view surface map was reconstructed through the neighboring images stitching by defining the location of the overlapped patterns. Finally, 3D full-view stereoscopic images were obtained. The whole measurement and imaging processing operations were automated in the LABVIEW and MATLAB software environments, and the whole process took less than one second. In this experimental study, the patterns were simply made by attaching the metal stickers (ø 10 mm and 1 mm thickness). Those were randomly attached around the rod, and the rod was attached to the aerostatic spindle.

Figure 33:
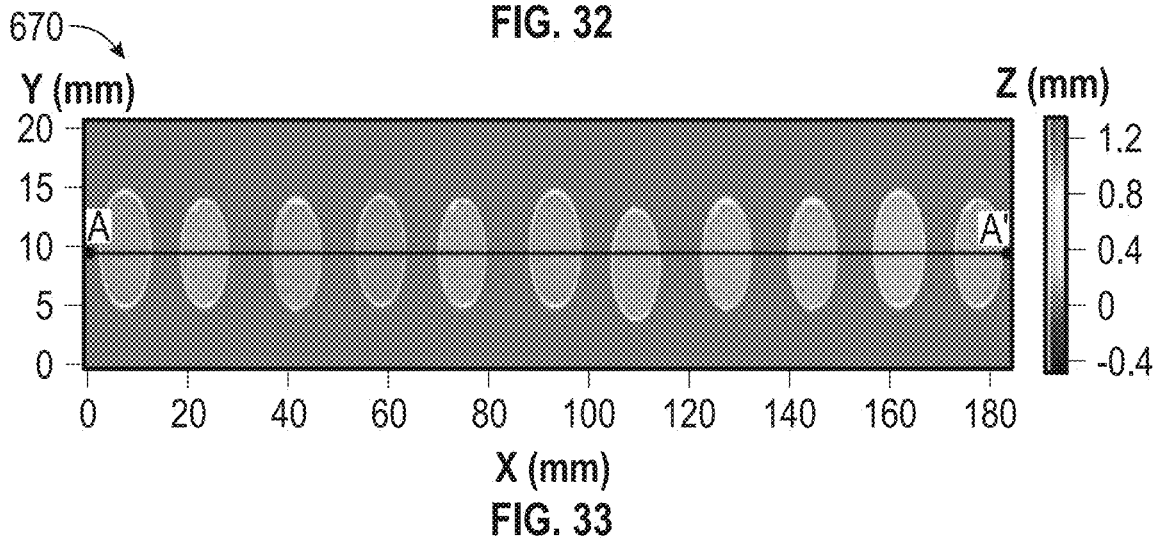
FIG. 33 is a graph depicting a whole-view surface map reconstructed using a feature-selective segmentation process.

Referring to FIG. 33, the F-SS applied whole-view surface map 670 obtained from the sticker-bearing rod is shown. The surface map 670 was in-process obtained in real-time while the rod was rotating at a 100 revolution per minute (RPM). The reconstructed panorama full view image and the profile results showed that the pattern diameter, height, and interval were identified, as seen in FIG. 33. The isometric view and top view of the rod with the 1.0 mm thick patterns were also successfully reconstructed.

While embodiments of the disclosure have been shown and described, modifications thereof can be made by one skilled in the art without departing from the scope or teachings herein. The embodiments described herein are exemplary only and are not limiting. Many variations and modifications of the systems, apparatus, and processes described herein are possible and are within the scope of the disclosure. For example, the relative dimensions of various parts, the materials from which the various parts are made, and other parameters can be varied. Accordingly, the scope of protection is not limited to the embodiments described herein, but is only limited by the claims that follow, the scope of which shall include all equivalents of the subject matter of the claims. Unless expressly stated otherwise, the steps in a method claim may be performed in any order. The recitation of identifiers such as (a), (b), (c) or (1), (2), (3) before steps in a method claim are not intended to and do not specify a particular order to the steps, but rather are used to simplify subsequent reference to such steps.

What is claimed is:

1. A three-dimensional (3D) fluorescent strobo-stereoscopic imaging system, the system comprising:
   a drive configured to couple to a sample to be imaged by the system, wherein the drive is configured to displace an outer surface of the sample at a desired speed;
   an ultraviolet stroboscopic illuminator configured to produce ultraviolet excitation light to stroboscopically illuminate the outer surface of the sample when the sample is coupled to the drive;
   a stroboscopic control module coupled to the drive and the stroboscopic illuminator, wherein the stroboscopic control module comprises a processor and a memory device encoded with instructions that, when executed by the processor of the stroboscopic control module, cause the stroboscopic control module to repeatedly activate the stroboscopic illuminator at a frequency that is based on the speed of the sample;
   a stereoscopic imaging unit comprising a pair of laterally spaced cameras orientable in the direction of the outer surface of the sample and configured to capture two-dimensional (2D) images of different sections of the outer surface of the sample as the outer surface of the sample is displaced by the drive; and
   an image reconstruction module in signal communication with the stereoscopic imaging unit, wherein the image reconstruction module comprises a processor and a memory device encoded with instructions that, when executed by the processor of the image reconstruction module, cause the image reconstruction module to reconstruct a 3D image of the sample from the 2D images of the different sections of the outer surface of the sample captured by the pair of cameras of the stereoscopic imaging unit.

2. The system of claim 1, wherein the drive comprises a rotary drive configured to rotate the sample about a rotational axis.

3. The system of claim 1, wherein a fluorescent coating is formed on the outer surface of the sample.

4. The system of claim 3, wherein the viscosity of the fluorescent coating is equal to or greater than ten micrometers.

5. The system of claim 1, wherein the stereoscopic imaging unit comprises a pair of band-pass filters positioned between the pair of cameras and the sample, wherein the pair of band-pass filters are configured to filter light reflected off the outer surface of the sample to produce filtered light that is received by the pair of cameras.

6. The system of claim 5, wherein:
   the reflected light contains wavelengths corresponding to an emission wavelength that is greater than an excitation wavelength of the excitation light and an ambient wavelength that is equal to or less than the excitation wavelength; and
   the pair of band-pass filters are configured to filter from the filtered light wavelengths of the reflected light that are less than the emission wavelength.

7. The system of claim 6, wherein the difference between the emission wavelength and the excitation wavelength corresponds to a Stokes shift produced by a fluorescent coating formed on the outer surface of the sample.

8. A three-dimensional (3D) strobo-stereoscopic imaging system, the system comprising:
   a drive configured to couple to a sample to be imaged by the system, wherein the drive is configured to displace an outer surface of the sample at a desired speed;
   a stroboscopic illuminator configured to produce excitation light to stroboscopically illuminate the outer surface of the sample when the sample is coupled to the drive;
   a stroboscopic control module coupled to the drive and the stroboscopic illuminator, wherein the stroboscopic control module comprises a processor and a memory device encoded with instructions that, when executed by the processor of the stroboscopic control module, cause the stroboscopic control module to repeatedly activate the stroboscopic illuminator at a frequency that is based on the speed of the sample;
   a stereoscopic imaging unit comprising a pair of laterally spaced cameras orientable in the direction of the outer surface of the sample and configured to capture two-dimensional (2D) images of different sections of the outer surface of the sample as the outer surface of the sample is displaced by the drive; and
   an image reconstruction module in signal communication with the stereoscopic imaging unit, wherein the image reconstruction module comprises a processor and a memory device encoded with instructions that, when executed by the processor of the image reconstruction module, cause the image reconstruction module to:
   reconstruct an initial surface map of the sample from the 2D images;
   segment the initial surface map based on features contained therein to separate a background image from a target image each contained in the initial surface map;
   separately condition the background image and the target image to produce a conditioned background image and a conditioned target image; and
   merge the conditioned background image with the conditioned target image to form a final surface map of the sample.

9. The system of claim 8, wherein the drive comprises a rotary drive configured to rotate the sample about a rotational axis.

10. The system of claim 8, wherein the instructions encoded onto the memory device of the image reconstruction module, when executed by the processor of the image reconstruction module, cause the image reconstruction module to:
    minimize image distortions from the 2D images to produce a plurality of conditioned 2D images; and
    reconstruct the initial surface map of the sample from the plurality of conditioned 2D images.

11. The system of claim 8, wherein the instructions encoded onto the memory device of the image reconstruction module, when executed by the processor of the image reconstruction module, cause the image reconstruction module to:
    merge by linear extraction the conditioned background image with the conditioned target image to form the final surface map of the sample.

12. The system of claim 8, wherein a fluorescent coating is formed on the outer surface of the sample.

13. The system of claim 12, wherein the viscosity of the fluorescent coating is equal to or greater than ten micrometers.

14. The system of claim 8, wherein the stroboscopic illuminator comprises an ultraviolet stroboscopic illuminator configured to produce ultraviolet excitation light.

15. A method for reconstructing a three-dimensional (3D) image of a sample, the method comprising:

(a) displacing an outer surface of the sample at a desired sample;

(b) repeatedly activating an ultraviolet stroboscopic illuminator to produce ultraviolet excitation light at a frequency that is based on the speed of the sample;

(c) repeatedly activating a pair of laterally spaced cameras of a stereoscopic imaging unit as the outer surface of the sample is displaced to capture a plurality of 2D images of different sections of the outer surface of the sample; and (d) reconstructing a 3D image of the sample from the plurality of 2D images of the different sections captured by the pair of cameras.

16. The method of claim 15, wherein (a) comprises rotating the sample about a rotational axis.

17. The method of claim 15, wherein a fluorescent coating is formed on the outer surface of the sample.

18. The method of claim 17, wherein the viscosity of the fluorescent coating is equal to or greater than ten micrometers.

19. The method of claim 15, further comprising:
(e) filtering by a pair of band-pass filters light reflected off the outer surface of the sample to produce filtered light that is received by the pair of cameras.

20. The method of claim 15, wherein:
the reflected light contains wavelengths corresponding to an emission wavelength that is greater than an excitation wavelength of the excitation light and an ambient wavelength that is equal to or less than the excitation wavelength; and
(e) comprises:
(e1) filtering wavelengths by the pair of band-pass filters wavelengths of the reflected light that are less than the emission wavelength.

* * * * *